US008155498B2

(12) United States Patent
Dow et al.

(10) Patent No.: US 8,155,498 B2
(45) Date of Patent: Apr. 10, 2012

(54) SYSTEM AND METHOD FOR INDEXING COMMERCIALS IN A VIDEO PRESENTATION

(75) Inventors: Christopher Dow, Palo Alto, CA (US); Bruce Garcia, San Jose, CA (US); Adam Briggs, San Francisco, CA (US); Tai-Ming Chen, Los Gatos, CA (US); Chuang-Chun Liu, San Jose, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 2900 days.

(21) Appl. No.: 10/133,184

(22) Filed: Apr. 26, 2002
(Under 37 CFR 1.47)

(65) Prior Publication Data
US 2003/0202773 A1    Oct. 30, 2003

(51) Int. Cl.
| | |
|---|---|
| *H04N 5/932* | (2006.01) |
| *H04N 5/14* | (2006.01) |
| *H04N 5/76* | (2006.01) |
| *H04N 5/77* | (2006.01) |
| *H04N 5/78* | (2006.01) |
| *H04N 5/84* | (2006.01) |
| *H04N 5/93* | (2006.01) |
| *H04N 5/765* | (2006.01) |
| *H04N 5/783* | (2006.01) |
| *H04N 5/917* | (2006.01) |
| *H04N 7/00* | (2006.01) |
| *H04N 7/16* | (2006.01) |
| *H04N 7/173* | (2006.01) |
| *H04N 9/80* | (2006.01) |
| *H04J 3/04* | (2006.01) |
| *H04J 3/24* | (2006.01) |
| *G06F 15/16* | (2006.01) |
| *G11B 19/02* | (2006.01) |
| *G11B 21/08* | (2006.01) |

(52) U.S. Cl. ........ 386/221; 386/200; 386/225; 386/241; 386/247; 386/250; 386/251; 386/280; 386/293; 386/314; 386/329; 386/334; 386/346; 386/356; 348/231.6; 348/466; 348/700; 360/69; 360/71; 360/72.2; 369/30.07; 370/474; 370/535; 709/231; 709/246; 725/8; 725/133; 726/32

(58) Field of Classification Search .................. 386/7, 8, 386/45, 46, 52, 65, 68, 69, 70, 79, 81, 82, 386/83, 125, 126, E5.043, 241, 250, 251, 386/329, 346, 356, E5.001; 358/908; 360/69, 360/71, 72.2; 348/460, 700, 231.6, 466, 348/E7.082; 725/8, 133; 369/30.07; 707/7, 707/E17.037; 709/231, 246; 726/32; 370/474, 370/535; 375/E7.017, E7.022, E7.198, E7.271, 375/E7.275; G9B/27.012, 27.029
See application file for complete search history.

(56) References Cited

U.S. PATENT DOCUMENTS
4,760,526 A * 7/1988 Takeda et al. ..................... 707/7
(Continued)

FOREIGN PATENT DOCUMENTS
AU          694568          3/1996
(Continued)

OTHER PUBLICATIONS

Japanese Office action dated Feb. 23, 2010 in Japanese divisional application No. 2008-013902 filed Jan. 24, 2008 by Christopher Dow et al.
(Continued)

*Primary Examiner* — Thai Tran
*Assistant Examiner* — Syed Hasan

(57) ABSTRACT

Systems and methods for providing enhanced navigation of stored digital video content based upon an event index. Includes generation and storage of an event index, as well as navigation based on events in the event index. An example system is embodied in a digital video recorder that detects and stores black field and silent frame events for use in locating commercial groups. The commercial groups may be skipped or otherwise navigated based upon data pointers linking the stored events to corresponding locations in the video data file.

43 Claims, 11 Drawing Sheets

U.S. PATENT DOCUMENTS

| | | | |
|---|---|---|---|
| 5,333,091 A | 7/1994 | Iggulden et al. | |
| 5,455,630 A | 10/1995 | McFarland et al. | |
| 5,577,191 A * | 11/1996 | Bonomi | 345/502 |
| 5,594,736 A * | 1/1997 | Tatsumi et al. | 370/474 |
| 5,600,366 A | 2/1997 | Schulman | |
| 5,652,615 A | 7/1997 | Bryant et al. | |
| 5,661,516 A | 8/1997 | Carles | |
| 5,664,948 A | 9/1997 | Dimitriadis et al. | |
| 5,692,093 A | 11/1997 | Iggulden et al. | |
| 5,696,866 A | 12/1997 | Iggulden et al. | |
| 5,790,174 A * | 8/1998 | Richard et al. | 725/99 |
| 5,848,397 A | 12/1998 | Marsh et al. | |
| 5,886,731 A | 3/1999 | Ebisawa | |
| 5,987,210 A * | 11/1999 | Iggulden et al. | 386/46 |
| 5,995,092 A | 11/1999 | Yuen et al. | |
| 5,999,688 A | 12/1999 | Iggulden et al. | |
| 6,100,941 A * | 8/2000 | Dimitrova et al. | 348/700 |
| 6,215,526 B1 | 4/2001 | Barton et al. | |
| 6,226,444 B1 * | 5/2001 | Goldschmidt Iki et al. | 386/83 |
| 6,233,389 B1 | 5/2001 | Barton et al. | |
| 6,258,818 B1 * | 7/2001 | Lerner | 435/5 |
| 6,285,818 B1 * | 9/2001 | Suito et al. | 386/46 |
| 6,310,886 B1 | 10/2001 | Barton | |
| 6,324,338 B1 | 11/2001 | Wood et al. | |
| 6,327,418 B1 | 12/2001 | Barton | |
| 6,360,053 B1 | 3/2002 | Wood et al. | |
| 6,404,977 B1 * | 6/2002 | Iggulden | 386/46 |
| 6,937,658 B1 | 8/2005 | Suito et al. | |
| 6,993,246 B1 * | 1/2006 | Pan et al. | 386/52 |
| 7,272,295 B1 * | 9/2007 | Christopher | 386/251 |
| 7,302,490 B1 * | 11/2007 | Gupta et al. | 709/231 |
| 2001/0055463 A1 * | 12/2001 | Armengaud | 386/46 |
| 2002/0126999 A1 * | 9/2002 | Shimamoto et al. | 386/96 |
| 2005/0223403 A1 | 10/2005 | Suito et al. | |

FOREIGN PATENT DOCUMENTS

| | | |
|---|---|---|
| DE | 199 39 410 A1 | 3/2001 |
| EP | 0 693 215 B1 | 11/1998 |
| EP | 0 967 611 A2 | 12/1999 |
| EP | 1 071 287 A2 | 1/2001 |
| EP | 1 071 287 A3 | 3/2001 |
| JP | 62209615 | 9/1987 |
| JP | 03-184484 | 8/1991 |
| JP | 10224724 A * | 8/1998 |
| JP | 2000-115713 | 4/2000 |
| JP | 2000-165807 | 6/2000 |
| WO | WO 99/04561 A1 | 1/1999 |
| WO | WO 99/52279 A1 | 10/1999 |
| WO | WO 99/52285 A1 | 10/1999 |
| WO | WO 00/07368 A1 | 2/2000 |
| WO | WO 00/18108 A2 | 3/2000 |
| WO | WO 00/18108 A3 | 3/2000 |
| WO | WO 00/28736 A1 | 5/2000 |
| WO | WO 00/44171 A1 | 7/2000 |
| WO | WO 00/56072 A1 | 9/2000 |
| WO | WO 00/58833 A1 | 10/2000 |
| WO | WO 00/58834 A1 | 10/2000 |
| WO | WO 00/58967 A1 | 10/2000 |
| WO | WO 00/59214 A1 | 10/2000 |
| WO | WO 00/62298 A1 | 10/2000 |
| WO | WO 00/62299 A1 | 10/2000 |
| WO | WO 00/62533 A1 | 10/2000 |
| WO | WO 00/67475 A1 | 11/2000 |
| WO | WO 01/06370 A1 | 1/2001 |
| WO | WO 01/22729 A1 | 3/2001 |
| WO | WO 01/46843 A2 | 6/2001 |
| WO | WO 01/47238 A2 | 6/2001 |
| WO | WO 01/47249 A2 | 6/2001 |
| WO | WO 01/47279 A2 | 6/2001 |
| WO | WO 01/65762 A2 | 9/2001 |
| WO | WO 01/65862 A2 | 9/2001 |
| WO | WO 01/76249 A1 | 10/2001 |
| WO | WO 01/89203 A2 | 11/2001 |

OTHER PUBLICATIONS

EPO communication intending grant dated May 24, 2011 in European Patent Application No. 03736500.4 filed Apr. 28, 2003 by Christopher Dow et al.

* cited by examiner

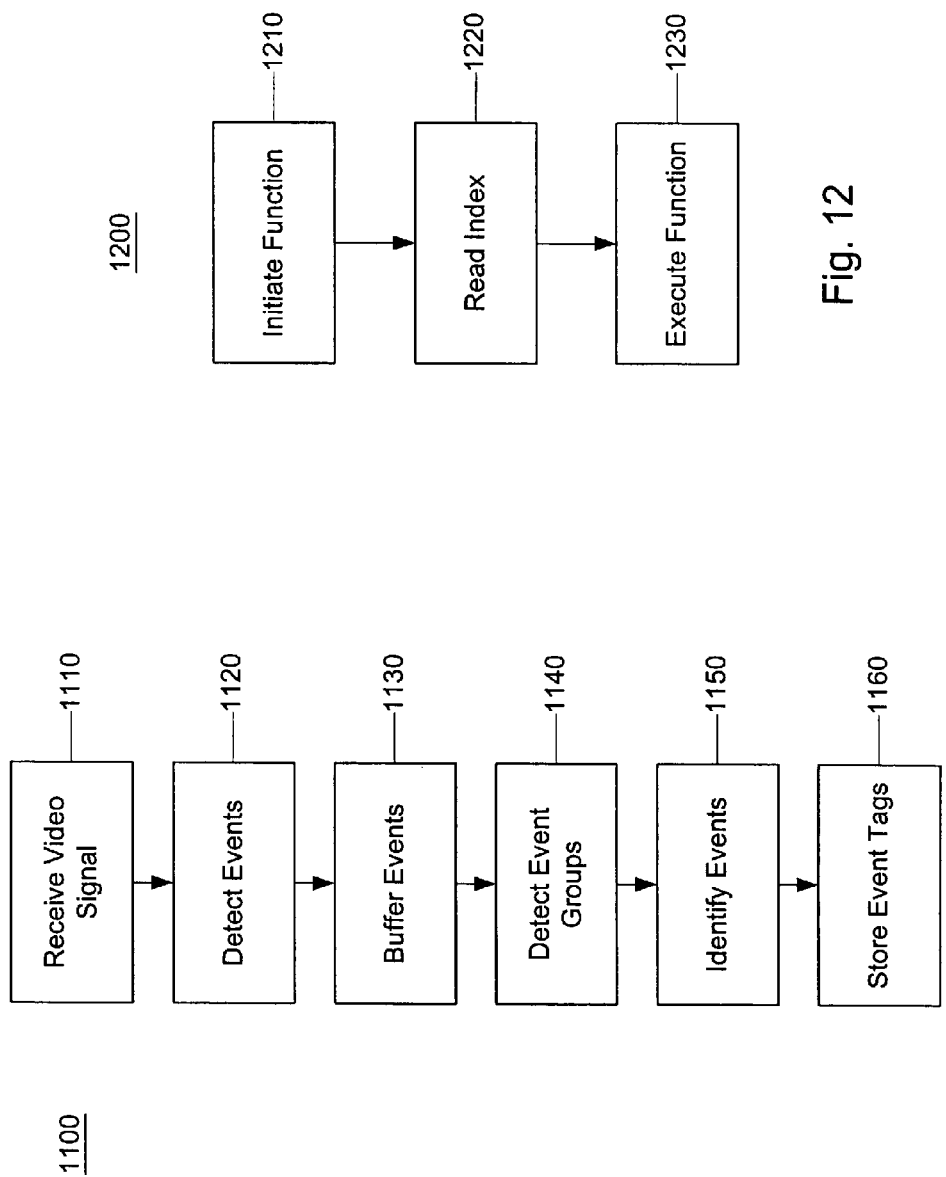

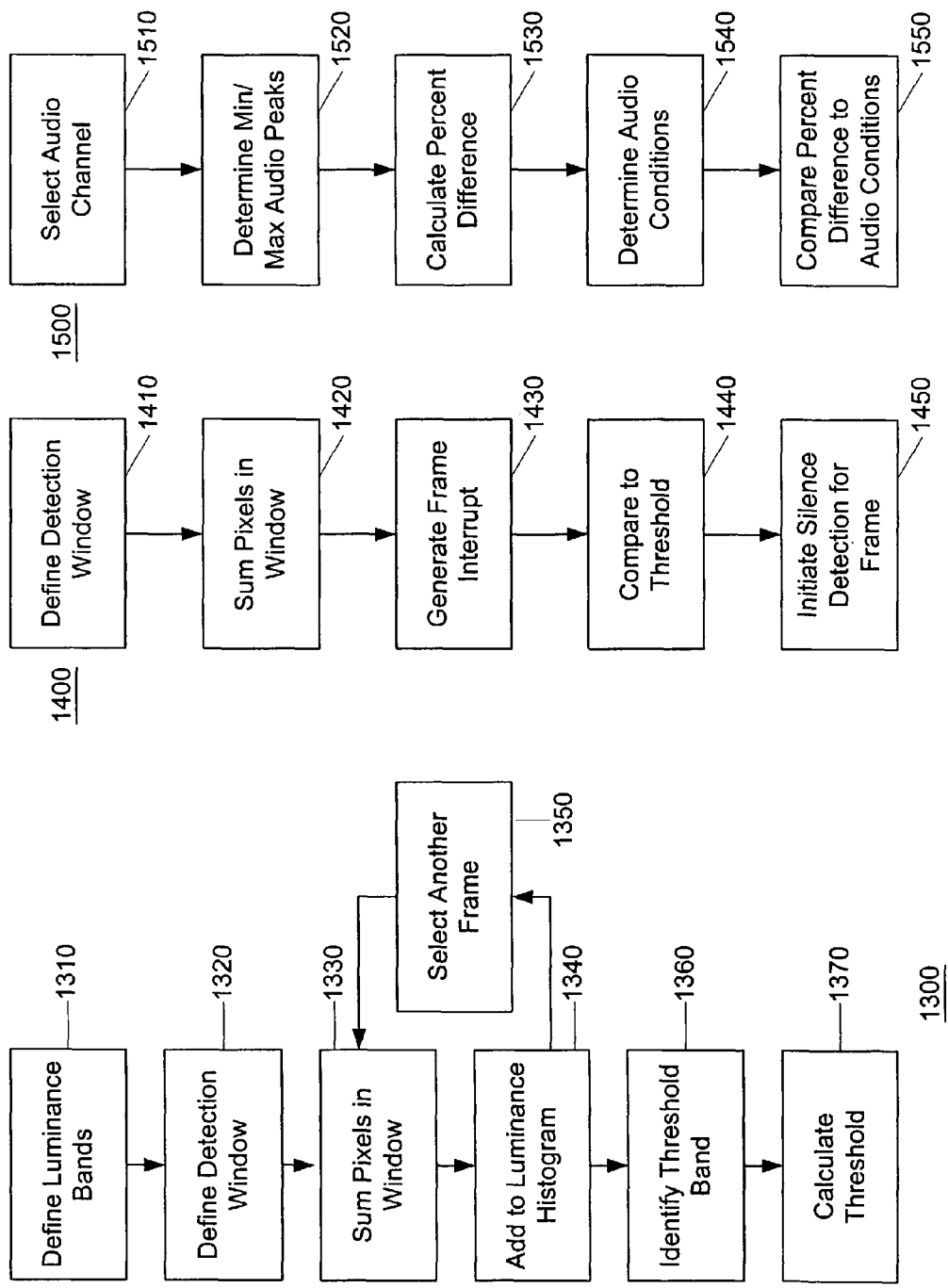

SYSTEM AND METHOD FOR INDEXING COMMERCIALS IN A VIDEO PRESENTATION

BACKGROUND OF THE INVENTION

1. Field of the Invention

The invention relates to the field of video recorder systems and, more specifically, systems and methods for recording, indexing, and navigating video content.

2. Description of the Related Art

Video recorder technology, such as videocassette recorders (VCRs) and digital video recorders (DVRs), have increased consumer control over how and when consumers view video programming. Since the advent of VCRs, consumers have been able to record broadcast video (e.g., television, cable, and satellite broadcasts) for later viewing. A video program is recorded onto a storage medium, such as a videocassette. The users can then view the program from the videocassette at their leisure. VCRs also provide navigation features for viewing the stored programs. VCRs typically allow users to pause, fast forward, and rewind through portions of the program, with or without viewing them. Some VCRs offer added navigational features, such as slow motion and variable speed fast forward and rewind, though the quality of these features is limited by the analog technology involved. Consumers viewing a recorded program can use the fast forward feature to advance quickly through content that they do not wish to view. A common use of this feature has become skipping commercials in recorded programs.

Recognizing that consumers desire the ability to quickly and accurately avoid the commercials in recorded programs, a feature was developed for VCRs that automated the identification and skipping of commercials. These VCRs use analog or digital video processing to identify events in the video signal that typically mark advertisements. Some of the events commonly identified include: black fields (the frames of "blank" video that are inserted between commercials), silent fields (the "blank" audio that frequently accompanies black fields), and abrupt volume changes (the volume increases that frequently accompany commercials). Unfortunately, these events may sometimes occur in program content, as well as in and around commercials.

Commercials are almost invariably presented in commercial groups that follow definable patterns. Black field and silent field events may separate each commercial in a commercial group. In order to overcome the limitations of identifying commercials based upon an isolated event, pattern-matching logic is used by the VCRs to identify the event patterns in commercial groups. Identified events are temporarily saved to buffer. A series of events in the buffer are analyzed according to the spaces between them. If a predefined pattern is recognized, a commercial group is identified. Once a commercial group is identified, appropriate markers are recorded on the videocassette, usually written into the control track. During playback, the beginning marker initiates automatic fast-forwarding. The fast-forwarding continues until an end marker for the group is reached. At which time, the VCR returns to normal play mode. The advertisement skipping logic may also provide a video display, such as a blue screen, during the automatic fast-forwarding.

Commercial skipping VCRs have a number of shortcomings that reduce their usability and effectiveness. First, events may not be as simple to reliably detect as they first appear. Signal quality can radically impact the quality of black fields and silence fields. The signal is rarely, if ever, actually zero. Additionally, many television networks and content providers have implemented watermarking or logos that appear even on black field screens. Delivery systems, networks, and content providers can all impact the quality of the black fields and silence. There are other variations in the types of frames used to separate advertisements and program content, such as full screen logos and monochrome screens other than black. The variety and complexity of events is likely only to increase in a digital broadcast environment and may include proactive attempts by networks and advertisers to evade commercial detection. Improved methods of detecting events, such as black fields and silent fields, are desirable.

Similarly, there is a great variation in the event patterns that may be used to identify commercial groups. Confusion with the scene pacing in a program may lead to false identification of commercial groups or portions of commercial groups, causing program content to be automatically skipped. In current implementations, commercial skipping logic does not even attempt to identify commercial groups near the beginning or ending of a program, where credits, teasers, and previews make it difficult to separate advertisements from program content. Event patterns may vary across networks, programs, and the time of day, week, or year. Event patterns may also evolve over time based upon changes in advertiser and viewer preferences. Event patterns are particularly susceptible to variation by the broadcast providers in order to avoid the pattern recognition logic of current systems. Improved methods of updating and executing pattern recognition logic are desirable.

Commercial skipping VCRs do not identify and mark commercials during initial recording, or even during first playback. The pattern matching function requires the buffering of multiple events before an earlier event can be identified as signifying the beginning of a commercial group. Further, the markers identifying the starting and ending points of the commercial group are stored on the videocassette. Once a commercial group is identified, the arrangement of reading and writing heads in most VCRs requires that the tape be rewound to the start of the commercial group in order to record the start marker on the videocassette. After initial recording but before the recording can be viewed with the commercial skipping feature, most commercial skipping VCRs execute a separate pass through the videocassette to identify events, identify commercial groups, and mark the commercial groups on the videocassette. Improved methods of indexing stored commercial groups are desirable.

Commercial skipping VCRs provide limited navigation options for identified commercials and commercial groups. Sequential recording and playback limit the practical options for navigating video content stored on videocassettes. The only navigation option provided by most commercial skipping VCRs is to skip identified commercial content based upon the beginning and ending markers placed in the control track. This function is generally binary—it is either on or off. However, users may desire more control over how and when commercial groups, or other identified video content, are viewed or not viewed. Improved methods of navigating indexed commercial groups are desirable.

DVRs are revolutionizing the way broadcast video content is stored, managed, and viewed. DVRs include systems for receiving, digitally storing, and playing back video content, such as video programs and commercials. DVRs generally use a digital storage media, such as a hard drive, for digitally storing compressed video content. While the video content is stored digitally, it is often received and played back as an analog signal-requiring one or more analog/digital converters. DVRs may provide a large number of enhancements for receiving, storing, and viewing video content, such as interactive program guides, interactive management of stored content, automated recording of new content, enhanced navigation features, file sharing and communications features, and other enhancements. Many of these enhanced features involve substantial data processing, memory, network, and graphical interface overlay capabilities. The combination of more flexible storage systems (e.g., digital file systems), enhanced processing power, and ubiquitous network technologies provides great potential for DVRs to overcome many of the limitations of VCRs.

Most DVRs store video content as compressed video files using a digital compression standard, such as MPEG. In order to provide time-based access to and navigation of the video files, DVRs may generate a companion index file containing a time index of the video file. For example, the index file may correlate GOPs (Group of Pictures, a unit of MPEG compressed data) to elapsed time. DVRs may use the data from the index file to enable time-based manipulation of the video data stream during play back. Varying the progression followed through the index file enables enhanced navigation options, such as slow motion, fast-forwarding, and rewinding—all at variable speeds and with better fidelity than prior analog systems. The index file frees the system from sequential access to the content file by allowing the system to directly access any time point in the content file. This aspect of the index file has been used to provide instant replay and skip forward features. These features provide a predefined jump backwards or forwards in the data stream during playback. They are commonly used to review content the user would like to see again or to skip content the user does not want to see at all. A favored use of the skip forward feature is to skip quickly through commercial groups. A 30 second skip forward is fairly effective in quickly navigating through commercials, which frequently run about 30 seconds or a multiple thereof. When used in this way, the user identifies the presence of a commercial and activates the skip forward, generally using a designated button on a remote control. If the user arrives at another commercial, the skip forward is activated again—and so on, until the user arrives at the desired program content. Hopefully, the skip forward does not carry the user too far, missing content the user wanted to see. While this method of avoiding commercials during playback has proven popular with DVR users, improved methods of detecting commercials and automatically skipping them are desirable.

SUMMARY OF THE INVENTION

The embodiments of the invention described below provide enhanced navigation of video content based upon identifiable events in the video signal or data stream. The described embodiments allow users to automatically skip commercials in recorded video programs in an improved manner. Video data corresponding to video content is stored in a first file. Data pointers corresponding to locations in the video data are stored in a second file, creating an event index. The data pointers are generated based upon predefined events and patterns of events in the video content, such as video and audio events indicative of transitions between video programs and commercials. The data pointers may be used to navigate the video content, for example, to automatically skip the commercials. Some embodiments of the invention may include methods of commercial detection, methods of providing enhanced navigation of video content, computer readable storage media including software instructions for detecting commercials, and video recorders enabling commercial detection and/or enhanced navigation.

BRIEF DESCRIPTION OF THE DRAWINGS

These and other features of the invention's embodiments are more fully described below. Reference is made throughout the description to the accompanying drawings.

FIG. 11 is a flow chart illustrating a second example method of generating an event index according to an embodiment of the invention.

FIG. 12 is a flow chart illustrating a second example method of providing content navigation according to an embodiment of the invention.

FIG. 13 is a flow chart illustrating an example method of determining a black field detection threshold according to an embodiment of the invention.

FIG. 14 is a flow chart illustrating an example method of detecting a video event according to an embodiment of the invention.

FIG. 15 is a flow chart illustrating an example method of detecting an audio event according to an embodiment of the invention.

DETAILED DESCRIPTION OF THE INVENTION

In the following description, numerous details are set forth to further describe and explain one or more embodiments of the invention. These details include system configurations, block module diagrams, flowcharts, and accompanying written description. While these details are helpful to explain one or more embodiments of the invention, those skilled in the art will understand that these specific details are not required in order to practice the present invention.

Figure 1:
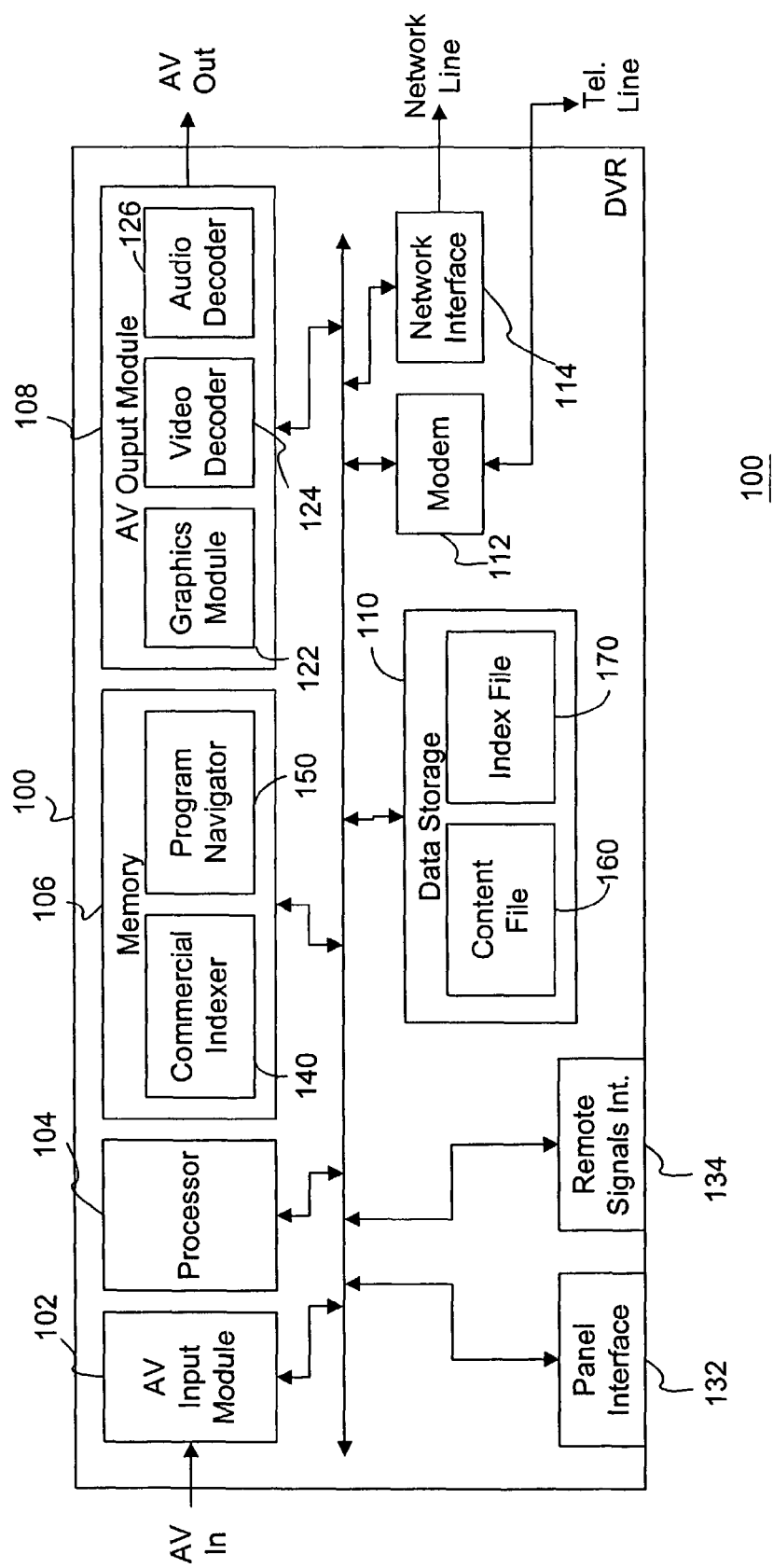
FIG. 1 is a block diagram illustrating a digital video recorder configurable to embody or include embodiments of the invention.

The block diagram of FIG. 1 illustrates a DVR 100 configured to include commercial detection in accordance with an embodiment of the present invention. The DVR 100 includes an AV input module 102, a processor 104, a memory 106, an AV Output module 108, a data storage medium 110, a modem 112 and a network interface 114 interconnected by a conventional bus architecture. Generally, the processor 104 executes instructions such as those stored in the memory 108 to provide functionality including that provided by certain embodiments of the present invention. Additional memory such as ROM and/or EEPROM (not shown) may store instructions for boot up sequences, DVR functionality updates, or other information. The network interface 114 is conventional and preferably allows connection to an Ethernet based network. This connection may be used to connect to a home network and in turn a broadband connection to a WAN such as the Internet or any of various alternative broadband connections.

The user may control the operation of the DVR 100 through control signals provided on the exterior of the DVR 100 housing through the panel interface 132, or through control signals originating from a remote control, which are received through the remote signals interface 134, in conventional fashion. Other conventional electronic input devices may also be provided for enabling user input to DVR 100, such as a keyboard, touch screen, mouse, joy stick, or other device. These devices may be built into DVR 100 or associated hardware (e.g., a video display, audio system, etc.), be connected through conventional ports (e.g., serial connection, USB, etc.), or interface with a wireless signal receiver (e.g., infrared, Bluetooth™, 802.11b, etc.).

The AV input module 102 receives input through various conventional interfaces, including coaxial RF/Ant, S-Video, component audio/video, network interfaces, and others. The received signals can originate from standard NTSC broadcast, high definition (HDTV) broadcast, standard cable, digital cable, satellite, Internet, or other sources, with the AV input module 102 being configured to include appropriate conventional tuning and/or decoding functionality. The DVR 100 may also receive input from other devices, such as a set top box or a media player (e.g., VCR, DVD player, etc.). For example, a set top box might receive one signal format and outputs an NTSC signal or some other conventional format to the DVR 100. The functionality of a set top box, media player, or other device may be built into the same unit as the DVR 100 and share one or more resources with it.

The AV input module 102 also preferably includes one or more MPEG encoding modules that converts signals from a first format (e.g., analog NTSC format) into an MPEG format (e.g., MPEG 2, etc.) that may be stored in the memory 108 or the data storage medium 110 such as a hard disk. Typically, content corresponding to the formatted data stored in the data storage medium 110 may be viewed immediately, or at a later time. Additional information may be stored in association with the MPEG data to manage and identify the stored programs. Other embodiments may use other appropriate types of compression.

The AV output module 108 further includes a graphics module 122, video decoder 124 and audio decoder 126. The video decoder 124 and audio decoder 126 are preferably MPEG decoders that can obtain the MPEG data stored in the data storage medium 110 and convert it to format compatible with the display device, typically the NTSC format that can be readily received by a conventional television set. The graphics module 122 receives various guide and control information and provides signals for corresponding displays, outputting them in a compatible format.

The DVR 100 processes guide information that describes and allows navigation among content from a system (e.g., the broadcast system) at present or future times, as well as content that has already been captured by the DVR 100. Guides that display such information may generally be referred to as content guides. These content guides include channel guides and playback guides. A channel guide displays available content from which individual pieces of content may be selected for current or future recording and viewing. In a specific case, the channel guide may list numerous broadcast television programs, and the user may select one or more of the programs for recording. The playback guide displays content that is stored or immediately storable by the DVR 100. Other terminology may be used for the guides. For example, they may be referred to as programming guides or the like. The term content guide is intended to cover all of these alternatives.

The DVR 100 may also be referred to as a Personal Video Recorder (PVR). One example of a DVR 100 that may incorporate embodiments of the present invention is the ReplayTV brand of DVRs provided by SONICblue Incorporated, a Santa Clara, Calif. company. A Replay Guide is an example of a playback guide implemented by ReplayTV DVRs.

Although certain modular components of a DVR 100 are shown in FIG. 1, the present invention also contemplates and encompasses units having different features. For example, some devices may omit the telephone line modem, instead using alternative conduits to acquire guide data or other information used in practicing the present invention. Additionally, some devices may add features such as a conditional access module (CAM), such as one implementing smart card technology, which works in conjunction with certain content providers or broadcasters to restrict access to content.

Additionally, although this embodiment and other embodiments of the present invention are described in connection with a DVR or PVR, the invention is equally applicable to other devices including but not limited to a set top box (STB), cable STB, satellite STB, or televisions containing modules with similar functionality.

In the embodiment shown, the DVR memory 106 includes an commercial indexer 140 and a program navigator 150 and the data storage 110 includes at least one content file 160 and at least one index file 170. The commercial indexer 140, the program navigator 150, the content file 160, and the index file 170 may be used to provide enhanced navigation of video content during playback.

The commercial indexer 140 provides automatic detection of audio and/or video events in a video signal or data stream. For example, the detected events may correlate to transitions in the content of the video data, such as breaks between commercials and program content. Detected commercials may include any and all non-program content, such as paid advertising, station identification segments, previews, and other program interruptions. Commercials may be presented in sequential clusters, referred to as commercial groups, which are framed by program content. The commercial indexer 140 may detect events, analyze event patterns, and store data regarding identified transitions in content. The data stored regarding the identified transitions in content may then be used by the program navigator 150 to provide enhanced playback options, such as commercial skipping. Alternatively, the commercial indexer 140 may detect events and store the data regarding the detected events. During playback, the program navigator 150 may analyze event patterns and provide enhanced navigation options based upon the analysis. In one embodiment, event indexer 140 includes software instructions for coordinating video processing, pattern recognition, and data storage tasks. The commercial indexer 140 may govern hardware components for carrying out some aspects of the commercial detection tasks. In some systems, commercial detection may be integrated with A/D conversion, data compression, time indexing, and storage of the video data in data storage 110.

The program navigator 150 provides navigation options for viewing stored video content. The program navigator 150 may include functional logic mapped to the receipt of one or more control signals. For example, the program navigator 150 may determine, at least in part, how the DVR responds to user input through a remote control, panel interface, or other input device. Interpretation of received control signals may be conditioned based upon phases of operation, for example, during playback, from a guide or menu, etc. The program navigator 150 may include a graphical user interface, icon, audio cue, or other interface responsive to received control signals. The program navigator 150 may include various navigation features utilizing a time-based index of stored video content. In one embodiment, the program navigator 150 provides logic for skipping commercials in a recorded video program based upon events identified by the commercial indexer 140. The commercial skipping logic may be activated through a menu selection or a specified button on the panel interface 132 or remote control (not shown). The program navigator 150 may include logic for presenting brief edited portions of the skipped commercials and an icon or other indicator to notify the user that commercials are being skipped. Other content navigation options based upon the detected events might include: viewing commercials and skipping program content, jumping to the next or previous commercial or program segment, or "chapter" access to commercials and program segments.

The content file 160 includes the stored video data of one or more recorded video transmissions. The video data may or may not be stored in the same format in which it was received. For example, an analog video signal may be received by the DVR 100 and converted to a digital video signal and the digital data corresponding to the content of the digital video signal may be stored in the content file 160. In one embodiment, the digital data may be compressed using one or more video data compression techniques to economize use of the data storage 110. The content file may include a single recording session, which may or may not include multiple video programs and intervening commercials. In one embodiment, each content file corresponds to a single recorded video program and its intervening commercials.

The index file 170 includes pointers to a plurality of locations in the content file 160. The pointers index the stored video data at various locations to enable access to and navigation of the video data. For example, the index file 170 may include pointers for program start and end locations, evenly spaced pointers for providing a time-based index of the program content, or pointers corresponding to an event in video content, such as a black field, content change (e.g., from program to commercial), or other detectable content.

Figure 2:
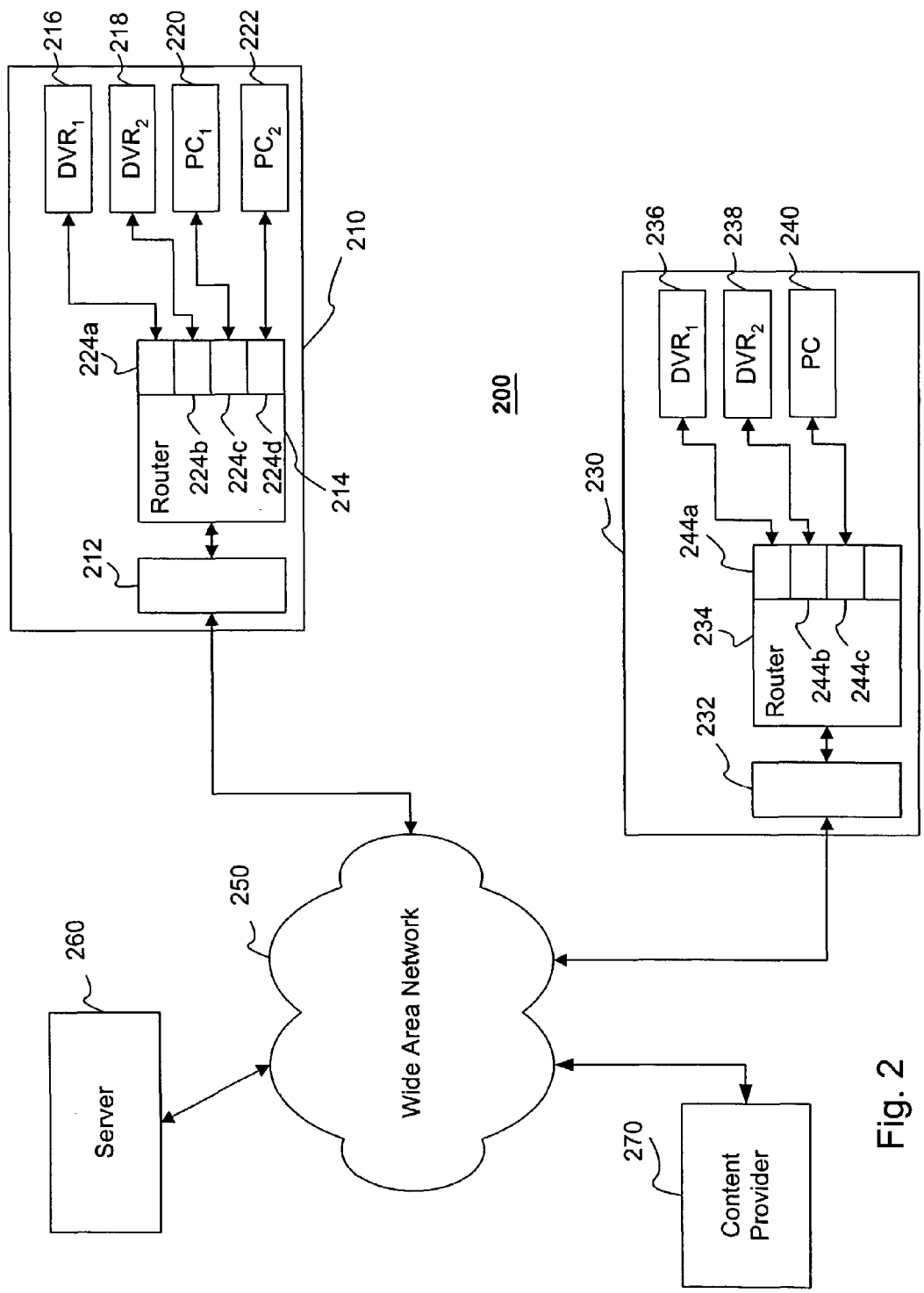
FIG. 2 is a schematic diagram illustrating an example of a system in which the embodiments of the invention may operate.

The DVR 100 may operate as a single home unit that is used in conjunction with a conventional television set, and that does not necessitate communication with other units. Alternatively, the DVR 100 may operate along with other units in various types of networks or the like. FIG. 2 illustrates an example of a system 200 in which several DVRs 216, 218, 236, and 238 are interconnected in local area networks 210 and 230. The local area networks 210 and 230 are, in turn, connected to a wide area network 250. A server 260 and a content provider 270 are also connected to the wide area network 250. The wide area network 250 may be the Internet. Conventional networking technologies may be used to facilitate the communications among the various systems. For example, the network communications may implement the Transmission Control Protocol/Internet Protocol (TCP/IP), and additional conventional higher-level protocols, such as the Hyper Text Transfer Protocol (HTTP) or File Transfer Protocol (FTP). Connection of DVRs to communication networks may allow the connected DVRs to share recorded content, utilize centralized or decentralized data storage and processing, respond to control signals from remote locations, periodically update local resources, provide access to network content providers, or enable other functions.

In one embodiment, the local area networks 210 and 230 are home network systems for interconnecting a variety of home electronics devices. The local area networks 210 and 230 may include or be portions of a smart home network interconnecting a variety of appliances and home subsystems. In the embodiment shown, the local area network 210 includes the DVRs 216 and 218, as well as PCs 220 and 222. Each of these units may be in a different location in the home and connected using conventional network technology and software. Communication among the units may allow remote operation and interchange between units. For example, the $DVR_1$ 216 located in a bedroom may connect to the $DVR_2$ 218 located in the living room. The $DVR_1$ 216 may access the guide information and stored video content of the $DVR_2$ 218. Similarly, the DVRs 216 and 218 may share resources with and enable control from the PCs 220 and 222. The types and quantities of access and data shared among units may be limited to prevent circumvention of copyright management and other security features.

The local area network 210 also includes a router 214 and a broadband interface 212. The broadband interface 212 may be a conventional digital subscriber line (DSL) modem, cable modem, or any device providing an interface between the home network and a broadband connection, including wired, wireless and any alternative broadband connections. The router 214 acts as a firewall between the devices 216-222 within the home network 210 and other devices potentially connecting with those devices through the Internet. Logical ports 224a-d are assigned for certain Internet communications made between the devices 216-222 and other devices outside the home network 210. These logical ports act as a barrier to certain file transfers.

Similar to local area network 210, the other shown local area network 230 includes a broadband interface 232 and router 234 through which units 236-240 may connect to each other and the Internet, using logical ports 244a-c. The local area network 230 may operate substantially as described above for local area network 210.

The server 260 may include any shared remote resource for data storage or processing that is accessible to multiple DVRs connected to the wide area network 250. The server 260 may facilitate communications among DVRs and other network resources, such as the content provider 270. In one embodiment, the server 260 is responsible for coordinating communications among DVRs and other network resources. For example, the server 260 may maintain content delivery information, including the network addresses and port information for various DVRs. The DVRs may periodically and automatically report their content delivery information to the server 260. Other DVRs may then contact the server 260 to receive the content delivery information. Communications between DVRs may be routed through the server 260 or may be made peer-to-peer using the content delivery information. Online content providers may query the server 260 for such information, which they may then use to complete content downloads.

The server 260 may be responsible for providing periodic updates of DVR software, guide data, service information, and other data. User specific event recognition and pattern recognition data, such as event thresholds and event patterns based upon user history, service, carrier, or program, may be provided in this manner. Similarly, new event types and event patterns may be provided to DVRs as they are developed. Software and graphical user interface driven navigation features may also be provided through the Server 260.

The server 260 may be responsible for receiving data from DVRs, storing and processing that information, and/or providing updated information back to the individual units. For example, the server 260 may collect usage data from DVRs on the network to provide aggregate program statistics and feature usage information. This function may also be used to collect event pattern data, analyze the data, and provide updated pattern matching algorithms for use by the DVRs.

The content provider 270 may include various services for delivering programming and advertising content through DVRs. For example, numerous websites produce original video content for download and viewing on a PC. Such video content may also be distributed through DVRs. As bandwidth and connectivity increase, more and more video content is likely to be distributed over wide area networks, such as the Internet. DVRs are particularly well suited to a content-on-demand distribution model.

Figure 3:
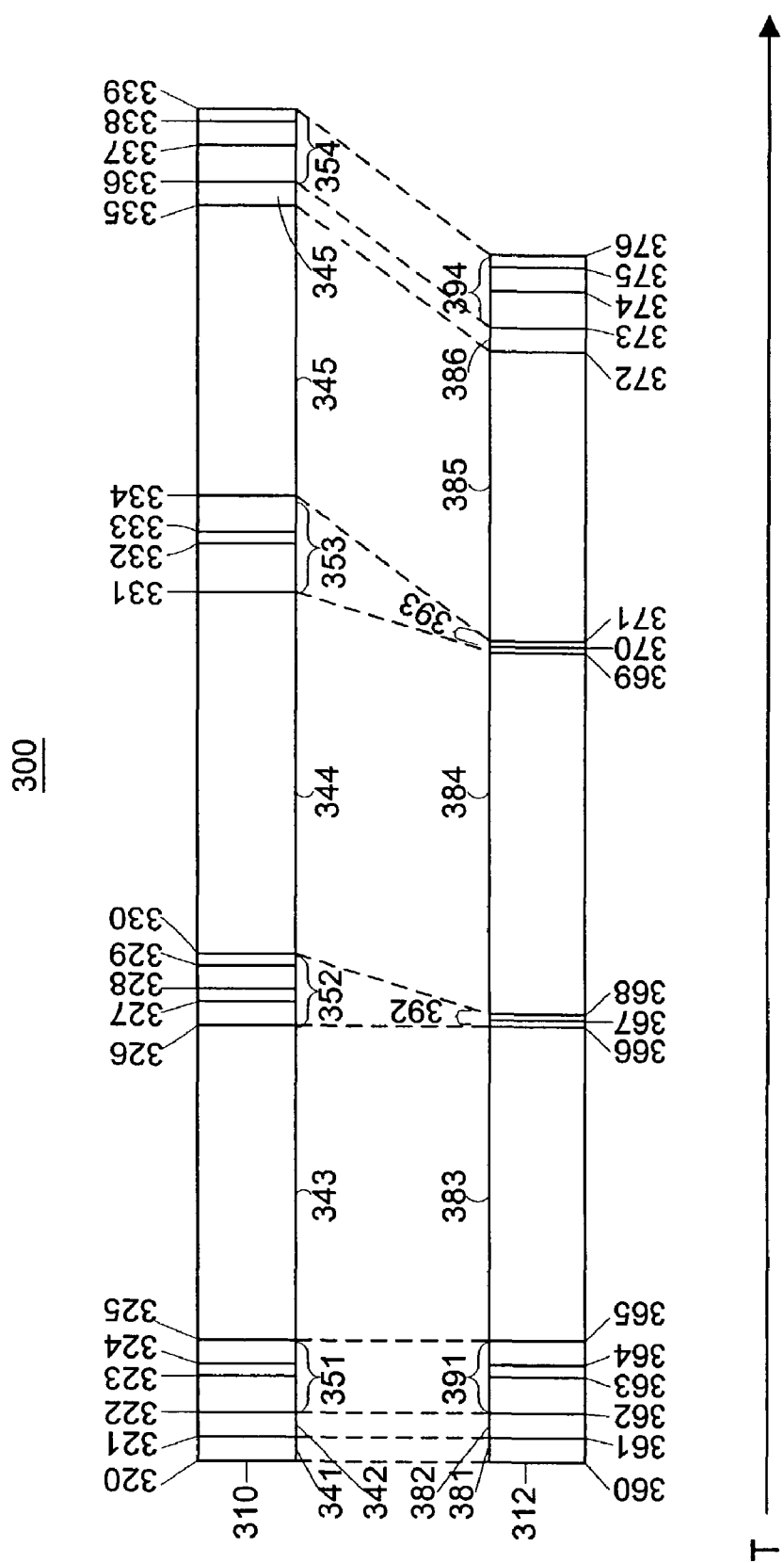
FIG. 3 is a diagram of recorded video content as viewed without and with the operation of an embodiment of the invention.

A user of the DVR 100 may use its enhanced navigation features to view recorded content with substantially reduced commercials. FIG. 3 shows a timeline of a program 300 that has been recorded on a DVR, such as the DVR 100. The first timeline 310 is the program 300 as it may be viewed in correspondence with how it was originally presented and stored on DVR 100. The second timeline 312 is the program 300 viewed with one embodiment of an automated commercial skipping feature enabled. The second timeline 312 provides a substantially different viewing experience, including a shortened total running time for the presentation.

The program 300 contains content of varying natures, for example, program segments and commercials. These portions of content are viewed sequentially in a normal presentation, such as during a television broadcast or standard replay from a recorded source. As the presentation progresses, abrupt changes attend the transition points between portions. These transitions, at the very least, comprise a scene change (e.g., from the sitcom characters in their apartment to a sleek new sedan taking a hairpin turn in a car commercial). Of course, not all scene changes represent a change in content, such as scene changes within a program segment or commercial. Most transitions between program segments and commercials include a brief transition screen, such as a black screen and attendant silence. Transitions between program segments and commercials may also be accompanied by changes in volume and other detectable events. Program segments generally do not alternate with single commercials, but with commercial groups containing multiple commercials. Transitions between commercials in a commercial group also usually include a transition screen and may or may not include other detectable events. Transitions among program segments and commercials are shown in the first, timeline 310 as transitions 320-339 and in second timeline as transitions 360-376. Each transition may include a transition screen and other detectable events.

The program content in program 300 is depicted as program content 341-346 in the first timeline 310 and program content 381-386 in the second timeline 312. Example program content may be a broadcast television program, such as a sitcom, soap opera, movie, or news program. The program content may include a teaser segment, a title credits segment, one or more chapter segments, and an end credit segment. For example, the program 300 includes a teaser segment 341, 381, a title credits segment 342, 382, a plurality of chapter segments 343-345, 383-385, and an end credit segment 346, 386.

The program 300 also includes a number of commercials embedded within the video presentation. The commercials are embedded as commercial groups, depicted as commercial groups 351-354 in the first timeline 310 and commercial groups 391 and 394 in the second timeline 312. Each commercial group is composed of 3-4 commercials separated by a corresponding number of transitions. There are four commercial groups 351-354 contained in first timeline 310, representing the commercial groups as broadcast and recorded. There are only two complete commercial groups 391 and 394 in the second timeline 312, representing operation of a commercial skip feature to substantially decrease the commercials presented during playback.

In the second timeline 312, the commercial groups 352 and 353 from the first timeline 310 have been replaced by indicators 392 and 393. The indicators 392 and 393 notify the viewer that commercials have been skipped. In one embodiment, the indicators 392 and 393 include brief portions (a few frames to several seconds) of the first and last commercial in the corresponding commercial group. The indicators may also include an icon overlay, audio cue, or other identifier for operation of the commercial skip feature. For example, an indicator could include 3 seconds from the beginning of the first skipped commercial, 7 seconds of the end of the last skipped commercial, and an icon overlay associated with the commercial skip feature. Alternate indicators may include brief portions of all commercials skipped or no portions of the commercials skipped. In an alternate embodiment, the commercial skip feature may be implemented without any indicators. Program segments 383, 384, and 385 would be presented sequentially without any interruption or other indication that commercials had been skipped.

The commercial groups 391 and 394 have been left unmodified by the commercial skip feature in the second timeline 312. In some embodiments, commercial detection and skipping may not operate within a certain period (e.g., 2 minutes) proximate the beginning and ending of a program presentation. This prevents accidental misidentification of short program segments commonly placed near the beginning or ending of a program. For example, viewers may wish to ensure that the teaser segment 341, 381, the title credits segment 342, 382, and the end credit segment 346, 386 are not accidentally skipped due to their similarity to advertisements. A user may be able to select whether or not beginning and ending segments are subject to detection and skipping. Alternate embodiments may skip all commercials in a program based upon user aggressiveness settings or alternate event and pattern detection techniques that can safely distinguish introductory and closing segments.

Figure 4:
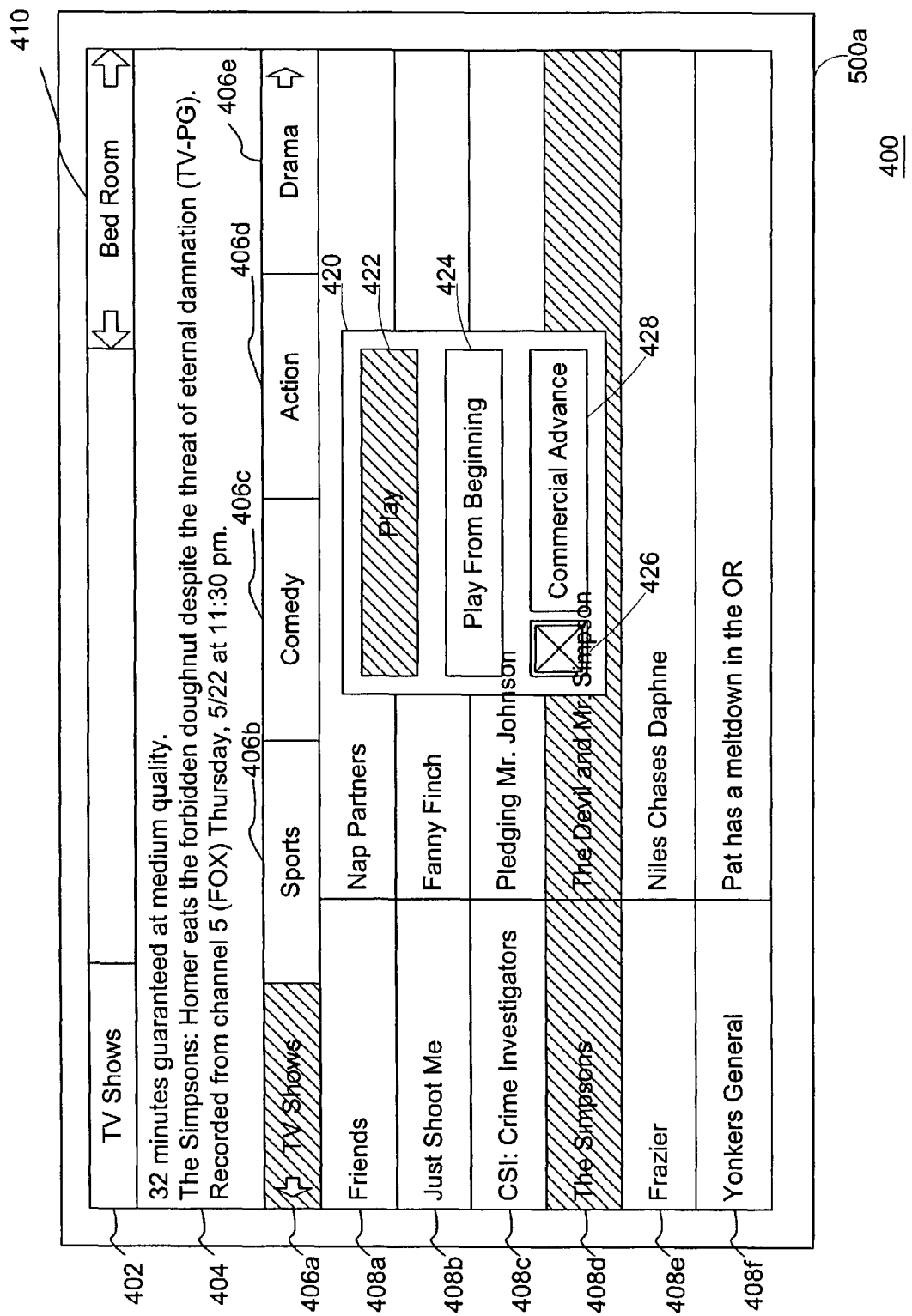
FIG. 4 is an example user interface display that may be used in conjunction with embodiments of the invention.

FIG. 4 shows an example graphical interface 400 for a system enabling commercial skipping navigation, such as the DVR 100 from FIG. 1. Graphical interface 400 may be generated by a graphics module, such as graphics module 122, and output to an attached display device, such as a television, computer monitor, handheld display, or other display device.

In the embodiment shown, a content guide 400a is displayed to allow the user to select a recorded program from a number of recorded programs. The content guide 400a may display both programs that have been recorded and those that have been selected for recording. The content guide 400a includes a header 402, a heads up display (HUD) 404, a categories area with several category listings 406a-e, a content area with several listed programs 408a-f, and a unit identification area 410. A menu overlay 420 provides the play options 422 and 424 for a selected program (408d), including a commercial skip toggle 426 and identifier 428.

The unit identification area 410 displays the name of the unit whose guide is being viewed. If the unit is a stand alone (not networked with other units), then the unit identification area 410 can be omitted or can provided a fixed display such as a logo.

The header area 402 displays a currently selected category, here "TV Shows." The content area lists the available programs in the selected category, including the shown entries 408a-f. While in the content area, the user navigates among the available programs using conventional remote control and display signals such as a cursor that moves in response to directional commands and that either automatically selects the underlying entry or does so in response to a selection signal (e.g., a joystick input can provide various directional commands and be pressed to "select" a currently highlighted area). The list of programs may exceed the number that can be shown in the content area. Downward cursor navigation beyond the lowermost entry 408f causes un-displayed entries to appear, unless the last in the category. The HUD 404 displays additional information regarding a currently selected entry. Here, it displays recording quality and other information about the current program for entry 408d, "The Simpsons."

The menu overlay 420 displays one or more ways of viewing the previously recorded programs, including using the commercial skipping feature. Display of menu overlay 420 may be initiated based on a control signal received from the user, e.g., when the user presses select on the remote control. Menu overlay 420 is shown in conjunction with content guide 400a, but could also be used with a recorded program presently being viewed or another interface for governing playback or other program navigation, such as a scene or chapter selection interface. The play button 422 plays the selected program from where the viewer most recently left off. The play from beginning button 424 plays the selected program from the beginning, regardless of where the viewer previously left off. Other play modes and menu options may be offered through the menu overlay 420. The commercial skip toggle 426 indicates whether the commercial skip feature is enabled or not. For example, if the commercial skip toggle 426 is marked (as shown), the commercials will be skipped when the program is played, regardless of the play mode selected. The identifier 428 indicates the purpose of the toggle 426 and may include a functional description, a trademark designation, an icon, or some combination. The toggle 426 and identifier 428 allow the user to toggle the commercial skip feature on and off. For example, the highlighted area (shown on the play button 422) may be moved to the identifier 428 using appropriate control signals. Another control signal, such as from the select button, will toggle the toggle 426 between on and off. There are other conventional interfaces that may be used for enabling and disabling the commercial skip feature.

Figure 5:
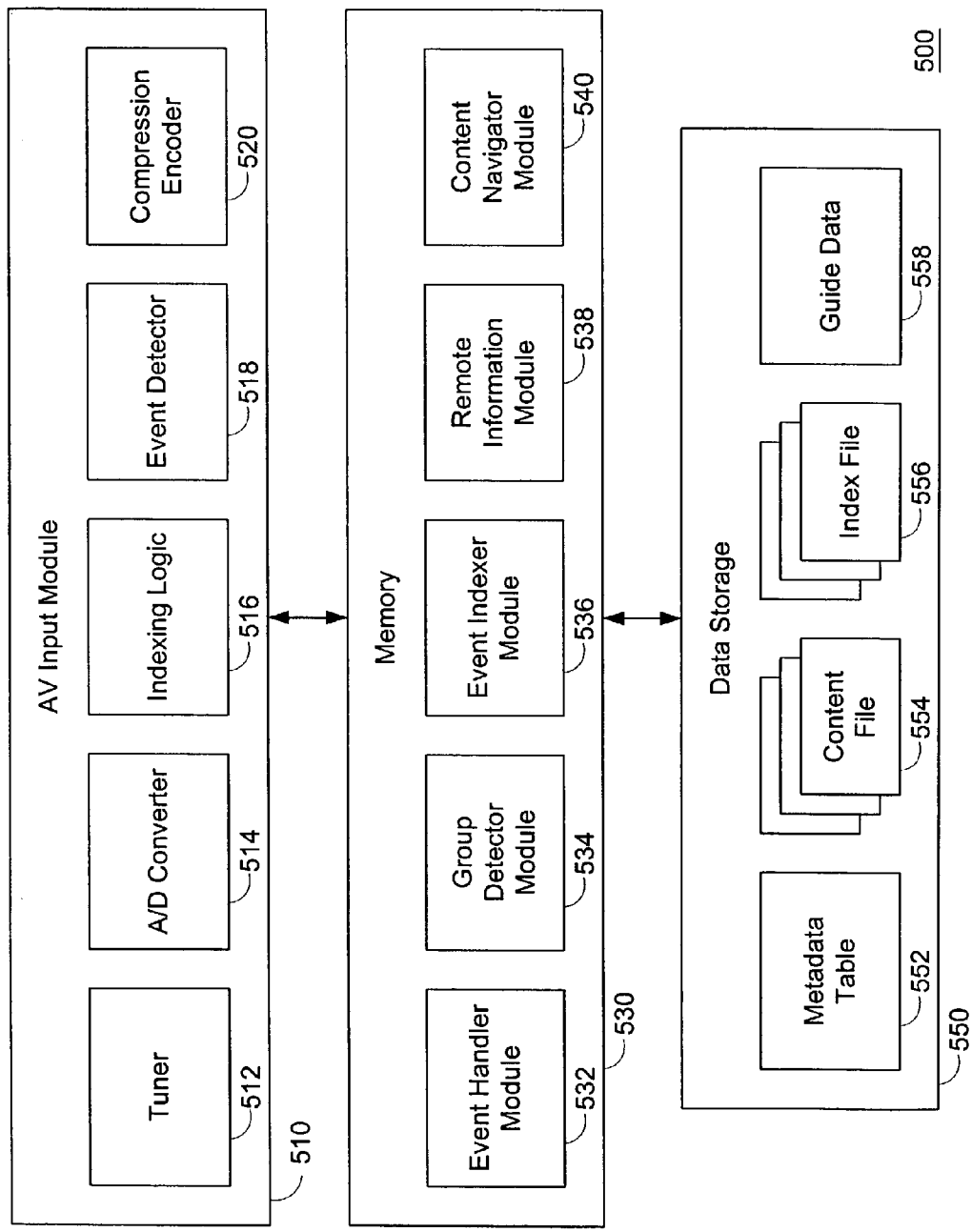
FIG. 5 is a block diagram illustrating an embodiment of the invention that may be embodied in a digital video recorder, such as the digital video recorder of FIG. 1.

FIG. 5 shows a modular configuration 500 for implementing an improved commercial skip feature in accordance with the invention. Configuration 500 includes a plurality of functional modules organized within structures found in a typical DVR, such as DVR 100. The structures include an AV input module 510, a memory 530, and a data storage 550. The AV input module 510 includes hardware modules for receiving, processing, and redirecting data from a received signal. The memory 530 includes software modules for processing received data, selectively storing secondary data, and providing navigation of stored content. The data storage 550 includes files for storing content and other data used in the operation of the DVR. The software modules in the memory 530 may be loaded from the data storage 550 and may oversee the operation of both the AV input module 510 and the data storage 550.

The AV input module 510 receives an external signal, such as a broadcast signal, signal from another playback device, or packetized communication signal. The AV input module 510 directs content data corresponding to the content of the received signal to the data storage 550. The AV input module 510 may provide conversion, indexing, event detection, and compression based upon the received content data. In the embodiment shown, the AV input module includes a tuner 512, an A/D converter 514, indexing logic 516, an event detector 518, and a compression encoder 520.

The tuner 512 is a conventional tuner for selecting a signal or channel from a spectrum of available signals or channels. A tuner may be unnecessary where the data carrier consists of a single signal or channel.

The A/D converter 514 is a conventional A/D converter for converting analog signals into digital data corresponding to the video and other content of the analog signal. The digital data may be replicated to multiple other modules for simultaneous processing and storage. For example, event detection or other video processing may be carried out simultaneously with compression and storage of the video data. In alternate embodiments, video processing may be carried out on the analog signal before conversion. The A/D converter 514 may be obviated in systems where the video data is received in a digital format. The AV input module 510 may include any number of conversion modules for converting between conventional broadcast or communication signals and a digital format used within the DVR.

The indexing logic 516 is conventional logic for time indexing a digital video data stream. For example, the indexing logic 516 could generate a fixed size record containing the time of arrival of each GOP as each GOP is received. The record may also include the byte offset from the beginning of the content file, the size in bytes of the first frame of the GOP, and additional flags for marking events within the GOP. The resulting group of records may then be scanned to find the nearest GOP to a given time, thus providing a time index. In some embodiments, indexing logic 516 may be obviated by systems including pre-indexed video programs. For example, index data may be provided along with content data in a received data stream.

The event detector 518 provides detection of one or more types of events in the video data. For example, the event detector 518 may include a plurality of conventional detectors for calculating total video signal or total audio signal, or portions thereof. Further description of an example embodiment of a video event detector and an audio event detector are provided below in conjunction with FIG. 6. Some detectable events may be based upon content other than black fields and silence. For example, events may be detected based upon video processing that identifies particular images, text, patterns, and other commercial markers. The event detector 518 may carry out a detection algorithm for abstracting one or more values from the video data. The abstracted values may be processed or combined with other values before being passed or raising an indicator value (e.g., a flag) to another module for further processing. The abstraction and combination of values, including threshold values or other criteria for events, may be embodied in a logic chip, such as a field programmable gate array (FPGA). In some embodiments, event detection may not be necessary. For example, video programs may be broadcast with metadata indicating video events, content transitions, or other data useful for commercial detection and skipping.

The compression encoder 520 provides compression of the video data for storage in the data storage 550. The compression encoder 520 may include any system for removing redundant and unnecessary information from video data. The removal of such information decreases the amount of storage space and bandwidth that is required to store and communicate video images and sound. The compression encoder 520 may include conventional encoding logic for one or more data compression standards, such as MPEG-1, MPEG-2, MPEG-4, H-261, H-263, and others. The compression encoder 520 may operate in conjunction with the A/D converter to compress the video data as it is generated from the analog video signal. The compression encoder 520 may operate in conjunction with the indexing logic 516 in order to correlate time to compressed video units. For example, an MPEG encoded data stream or file may include Group of Pictures (GOP) headings that can be correlated to a time-based index by the indexing logic 516. In some embodiments, compression encoding may be unnecessary. For example, some systems may broadcast and share data already formatted with appropriate video compression.

The memory 530 contains executable software modules for overseeing operation of the commercial skip feature. The memory 530 may include one or more conventional RAM units connected through a bus architecture to a microprocessor, the AV input module 510, and the data storage 550. The memory 530 may oversee operation of event detection, event group pattern detection, event indexing, updating event detection and navigation information, and providing navigation features based upon the event index. In the embodiment shown, the memory 530 includes an event handler module 532, a group detector module 534, an event indexer module 536, a remote information module 538, and a content navigation module 540. In alternate embodiments, one or more functions described in conjunction with the memory 530 may be carried out in a hardware module, remote system, or other system resource.

The event handler module 532 provides logic for handling events detected by the event detector 518. In one embodiment, the event handler module 532 receives one or more values describing an event detected by the event detector 518. For example, the event handler module 532 may receive an event flag, a luminance value, or a maximum and minimum audio value for a particular field, frame, GOP, or time point in the video data stream. The event handler module 532 may evaluate the received data to determine whether it meets threshold criteria for an event. The threshold criteria may include predefined values for both the event data and the event time. For example, the event handler module 532 may evaluate a plurality of received luminance values against a predefined threshold generated from a luminance histogram, but only if it falls within an event detection window that excludes the first and last two minutes of a recorded program. A detected event meeting the evaluation criteria of event handler module 532 is passed to the group detector module 534 for further analysis. In the alternative or in conjunction with being passed to the group detector module 534, the detected event may be passed to the event indexer module 536 to be stored for later analysis and use. In one embodiment, the event handler module 532 may evaluate a first type of event data, such as luminance, and provide instructions to the event detector 518 to capture event data for a second type, such as maximum audio, if certain conditions are met by the first type of event data. Further description of an example event handler module is provided below with regard to FIG. 6. In an alternate embodiment, event data or other metadata may be provided with received video data. The event handler module 532 may provide logic for evaluating the received event data or other metadata to select events relevant to locating commercials in the video content.

The group detector module 534 provides pattern matching logic for evaluating a plurality of detected events. The group detection module 534 detects commercial groups based upon identifiable spacing patterns followed by commercial programmers. The group detection module 534 may receive a series of detected events from event handler module 532. In an alternate embodiment, the group detection module 534 may receive the detected events from the content navigation module 540 as it reads them from the index files 556 during playback. In one embodiment, the group detection module 534 saves received events to a temporary buffer for analysis. Alternatively, all detected events for a given program can be saved to a file location in the data storage 550 and analyzed from there. The group detection module 534 evaluates the series of detected events, or some portion thereof, against logical conditions for identifying a commercial group. For example, the group detection module may evaluate interval patterns between the occurrence of certain types of detected events. Further description of an example group detector module is provided below with regard to FIG. 8. In an alternate embodiment, metadata identifying the nature of the video content may be provided with received video data. The group detection module 534 may select data relevant to locating commercial groups in the video content from the provided metadata.

The event indexer module 536 provides the logic for writing an event index into the data storage 550. The event indexer module 536 receives one or more identifiers and corresponding file locations for those identifiers. For example, the event indexer module 536 may receive a first tag indicating a starting location for a commercial group and a second tag indicating an ending location for a commercial group. Other identifiers may include those corresponding to particular types of events (e.g., black field, silent frame, both, etc.), where multiple types of events may be detected by the event detector 518 and the event handler module 532. The event indexer module 536 may generate a data pointer indicating the nature of the location to be tagged (e.g., black filed/silent frame event) and the corresponding location in a content file in the data storage 550. In one embodiment, the event indexer module 536 inserts the tag within a time-based index file associated with the particular content file. In an alternate embodiment, the event indexer module 536 inserts the tag and location in a separate event index. In some embodiments, the event indexer module 536 may be unnecessary. For example, the video programs within the system may be received with pre-generated commercial indices. Further description of an example event indexer module is provided below with regard to FIG. 6.

The remote information module 538 provides access to remote resources for enabling improved commercial skip functions. The remote information module 538 may include conventional network communication protocols for exchanging data with remote resources. For example, the remote information module 538 may utilize TCP/IP, HTTP, FTP, Ethernet, combinations thereof, or other protocols for communicating with remote servers or other units. The remote information module 538 may work in conjunction with one or more network adapters, modems, or other communication devices. The remote information module 538 may provide updated functions and data to other modules in the memory 530 and the data storage 550. For example, the remote information module 538 may periodically download updated detection schemes, threshold conditions, program logic, grouping logic, tags, index data, or new software modules. In one embodiment, the remote information module 538 periodically checks with a central server to determine if one or more new updates are available. If so, the update is downloaded and installed automatically on the DVR. For example, the remote information module 538 may periodically download updated threshold values for event detection and commercial group patterns for group detection. The threshold values and commercial group patterns may be updated on the central server to reflect changes in content provider, broadcaster, and carrier signals and program formats. The downloaded updates may be provided in conjunction with more general software and data updates for the DVR. In one embodiment, the remote information module 538 may periodically provide information to a central server. For example, the remote information module 538 may provide a daily upload of usage logs reflecting events and event patterns detected in recorded content and the use of enhanced navigation features during content playback. The uploaded information may be provided in conjunction with more general usage logs regarding system and user information.

The content navigator module 540 provides one or more navigation functions utilizing the event index data. For example, the content navigation module 540 may include a commercial skip function that operates during playback to: 1) recognize an event tag identifying the beginning of a commercial group; 2) identify the end of the commercial group; and 3) guide the data stream from the content file location corresponding to the first event tag to the content file location corresponding to the end of the commercial group. In some embodiments, the commercial skip function may locate the end of the commercial group based upon a second pointer included in the first index tag or may scan forward for a second index tag identifying the end of the commercial group. In some embodiments, the event tags may not directly correlate to the beginning or end of a commercial group. For example, when all events detected and processed through event handler module 532 are added to the event index. In these embodiments, the content navigation module 540 may select the first event tag and any subsequent tags for a preset period (e.g., 2 minutes). This group of event tags may be passed to the group detection module 534 for identification of the beginning and end of a commercial group. In one embodiment, the content navigation module 540 constantly buffers encountered event tags to the group detection module 534 during playback (when appropriate navigation features are enabled). The event tags may be buffered ahead of the actual playback stream to allow forward analysis of commercial groups. In one embodiment, all event tags for a video program are buffered for analysis when playback is initiated.

The content navigation module 540 may provide an indicator in order to notify the user that the commercial skip function has skipped commercial content. For example, the content navigation module 540 may play a small portion of one or more commercials in a skipped commercial group. The content navigation module 540 may provide an icon or other cue that indicates operation of the commercial skip function, such as an icon overlay, an audio cue, an LED or other indicator on the DVR control panel or remote control, or other indicator. The content navigation module 540 may map the functions it provides to particular user interfaces and control signals. For example, the content navigation module 540 may provide additional menu options in a graphical user interface for operation of the functions. The menu options may be provided through a conventional menu driven DVR GUI. In one embodiment, operation of one or more functions may be determined by a default setting that may be modified by the user through selection of appropriate menu options. Control signals for the functions enabled by the content navigation module 540 may be received through any of the conventional input devices for a DVR. In addition to menu navigation signals from a remote control or other input device, a custom remote control button for toggling one or more functions on and off may be included. Custom control panel buttons may be included in some embodiments.

The content navigation module 540 may include a variety of functions utilizing the commercial index. For example, the content navigation module 540 may provide a function for viewing only commercials. In one embodiment, the content navigation module 540 would locate the first commercial group index tag in a video program. The content navigation module 540 plays the commercial content until it reaches the end of the commercial group then skips to the beginning of the next commercial group. As with the commercial skip function described above, an appropriate indicator may be provided to the user. Access to the commercials only feature may be offered through a play menu or other interface and control signal options. Additional functions utilizing the commercial index are possible. Additionally, event index based features may be combined with time index based features in operation. For example, a commercial skip feature may be used in conjunction with fast forward, slow motion, instant replay, skip forward, reverse, etc.

The data storage 550 may include any conventional digital data storage device. For example, the data storage 550 may include a hard drive, removable media drive, RAM, M/RAM, optical storage system, or other data storage device. In one embodiment, the data storage 550 may include a plurality of such devices. The data storage 550 stores data using a digital file system that allows rapid, non-sequential access to the data stored therein. In the embodiment shown, the data storage 550 includes a metadata table 552, at least one content file 554, at least one index file 556, and a guide data file 558.

The metadata table 552 provides a variety of information regarding stored video programs. The metadata table 552 may be based on conventional data management technology for organizing information into interrelated records. In one embodiment, the metadata table 552 may include a plurality of interrelated tables based on conventional relational database technology. The metadata table 552 may be organized according to the programs presently stored or scheduled to be stored in the DVR. For example, the metadata table 552 may include row entries corresponding to each video program recorded or waiting to be recorded. Each row entry may include a variety of data columns describing the particular program. The metadata table 552 may include information to be used for selecting and organizing stored content. For example, the metadata table 552 may include program name, one or more categories, program description, rating information, running time, recording quality, source, date/time of recording, etc. The metadata table 552 may include information to be used by the system for accessing and playing each program. For example, the metadata table 552 may include the location of a corresponding content file, corresponding index file (time-based index file and/or commercial index file), a data pointer for where the last viewing left off, etc. The metadata table 552 may be created using a combination of system information and user input information. For example, storage details may be derived from system information, program information may be derived from guide data 558, and category information may be provided by the user.

The content files 554 include the video data corresponding to stored video programs. The content files 554 include image data, audio data, and system and synchronization data for the stored video programs. The content files 554 may include a plurality of files, each corresponding to a particular stored video program. Alternatively, the content files 554 may include a single file with multiple video programs stored within. The start and end locations of various programs may be recorded in a separate index, such as the index files 556 or the metadata table 552. The content files may be stored in a compressed digital format.

The index files 556 include index data corresponding to locations in the content files 554. The index files 556 may include a plurality of data pointers that correlate file locations in the content files 554 with information about corresponding program content. The index files 556 may include time-based index data, commercial index data, program begin/end/last viewed data, and other video data indexing. The index files 556 may include a plurality of files, each corresponding to an index for a particular stored video program. The index files 556 may include a single file with multiple indices for multiple stored video programs. The index files 556 may include multiple index file types with specific index information, such as separate time-based indices and commercial indices. The index files may include one or more tables correlating elapsed time, GOPs, and one or more tags indicating an event in the video content. In one embodiment, an index file includes a header indicating the index file format and records corresponding to each GOP in the content file. The GOP records may each include a byte offset to the header of the corresponding GOP within the content file, the time in nanoseconds that the GOP was recorded, the time in nanoseconds that has been omitted from the recording so far, the size in bytes of the first frame of the GOP, a count of consecutive following GOPs that are copy-protected, flags indicating the presence of copy protection (e.g., Macrovision, CGSMA, etc.), the offset from the header to the first frame within the GOP, and flags indicating the presence of an event within the GOP. Index data may be generated by the indexing logic 516 and the event indexer module 536 and stored in the index files 556. In some embodiments, some or all of the index data may be received with a broadcast or transfer of a video program.

The guide data 558 includes data describing broadcast or on-demand video programming available to the DVR. The guide data 558 may include program titles, times, and other descriptive data for past, present, and future programming. The guide data 558 may be accessed and navigated through a user interface to determine what to view and record. When a program is recorded, corresponding guide data may be transferred to accessible locations in the metadata table 552 or elsewhere. In one embodiment, the guide data 558 may include index data that is stored in the index files 556 for use by the content navigation module 540.

Figure 6:
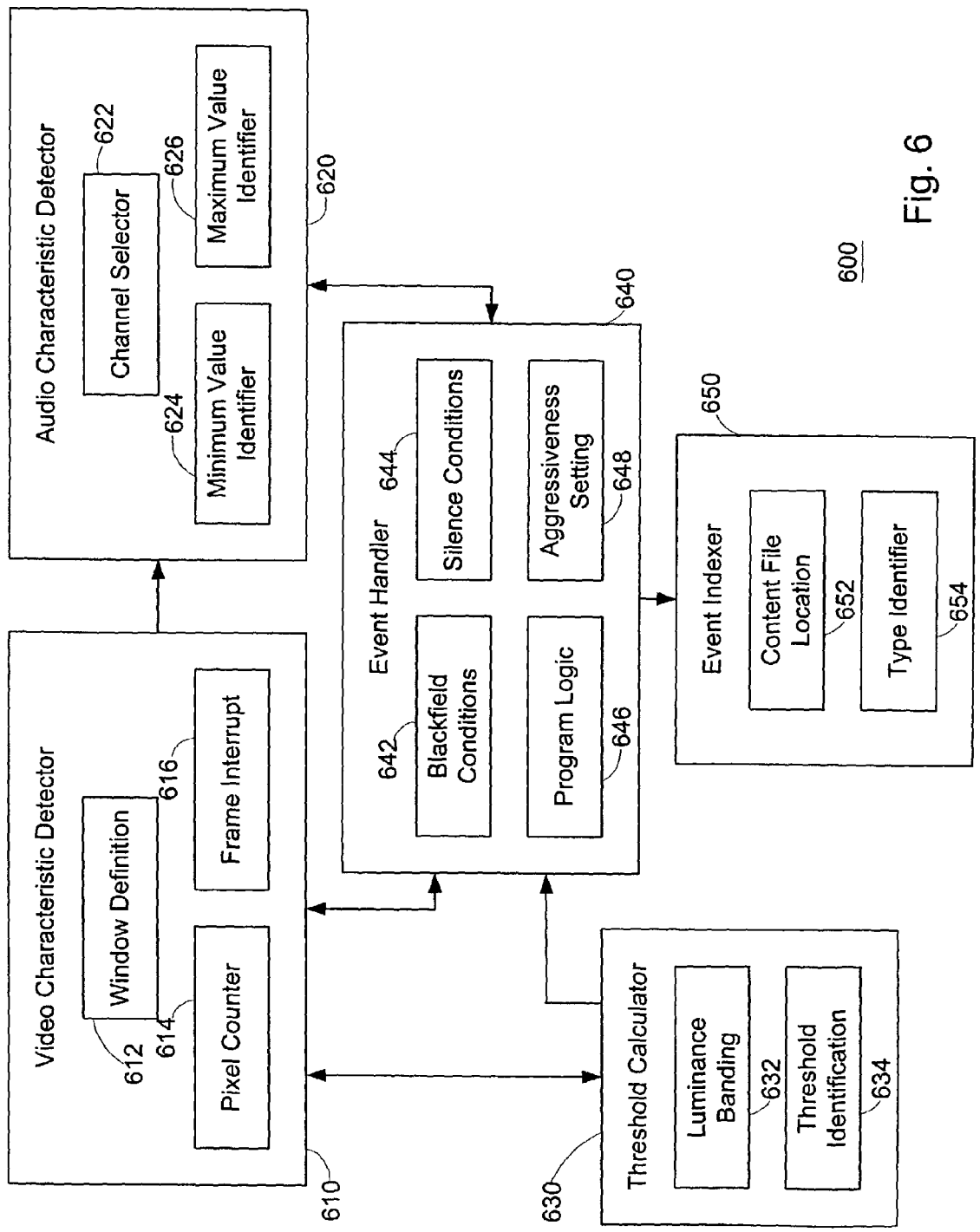
FIG. 6 is a block diagram illustrating a modular description of a system for generating an event index according to an embodiment of the invention.

FIG. 6 shows a system 600 for generating an event index. The system 600 may be embodied in a DVR, such as DVR 100 of FIG. 1. The system 600 operates on digital video data to detect certain characteristics of the audio and video, determine whether the detected characteristics correlate to one or more event conditions, and generate event index tags for insertion in an index file. The system 600 includes a plurality of modules. In one embodiment, the plurality of modules is embodied in software instructions on a computer readable storage media. The plurality of module may be executed in a DVR or other system that includes appropriate hardware for receiving or generating a digital video program and storing an event index. In an alternate embodiment, the plurality of modules may include a combination of software and hardware components for executing their functions. The system 600 includes a video characteristic detector module 610, an audio characteristic detector module 620, a threshold calculator module 630, an event handler module 640, and an event indexer module 650.

The video characteristic detector module 610 determines the total luminescence of a predefined portion of a video frame or field (standard broadcast video frames include 2 fields for even and odd scan lines). The video characteristic detector module 610 includes a window definition module 612, a pixel counter module 614, and a frame interrupt module 616.

The window definition module 612 defines the portion of the frame in which the pixel luminance will be aggregated. For example, the window definition module may define the sampling window to include the lines between lines 24 and 448. Because certain portions of a frame may routinely contain a non-black overlay, such as a station identification icon, it is helpful to be able to define a sampling window that avoids such inconsistencies. Similarly, some signals may include fringe distortions and inconsistencies that are easily avoided by not carrying the sampling window all the way to the edge of the frame. In some embodiments, the window definition module 612 may be updated or customized to reflect program, broadcaster, and carrier specific variations in black screen presentation.

The pixel counter module 614 aggregates the energy levels of each pixel in the defined window. The pixel counter module 614 extracts the brightness (y-component) data for each pixel and adds it to a total for the frame being analyzed. The pixel counter module 614 may calculate an absolute total energy for the frame or may divide by the number of pixels sampled to calculate an average luminance for the frame.

The frame interrupt module 616 determines when the end of the pixel data for the defined window of a particular frame is reached. When the end is reached, the frame interrupt module 616 passes the luminance total for the frame to the event handler module 640. The frame interrupt module 616 may also pass a GOP or time identifier to locate the frame data being passed. The frame interrupt module 616 zeros the total luminance value in the pixel counter and prepares for the next frame of pixel data. In one embodiment, the functions of the video characteristic detector module 610 are embodied in an FPGA.

The audio characteristic detector module 620 scans for silence in an audio "frame" located proximate a selected video frame, such as one that has been identified as black by the event handler module 640. The audio characteristic detector module 620 includes a channel selector module 622, a minimum value identifier, and a maximum value identifier 626.

The channel selector module 622 selects one or more channels of a multi-channel audio data stream in which to perform the value identification. For example, the channel selector module may sample data from the left and right audio channels. The selected channels are scanned over a predetermined number of audio frames surrounding the selected video frame. For each audio frame and each channel, the minimum value identifier 624 tracks the minimum peak value, while the maximum value identifier 626 tracks the maximum value. The minimum value identifier 624 and the maximum value identifier 626 may compensate for DC offset in the sample. Corresponding sets of minimum and maximum peak values are communicated to the data handler 640 to determine whether they meet a silence threshold. In one embodiment, the functions of the audio characteristic detector module 620 are embodied in a software module that scans incoming PCM data representing sound at each vertical blanking interrupt and signals silence events when a period of silence is detected within 7 frames of a frame that has been determined to be black.

The threshold calculator module 630 determines a luminance threshold for the black field detection. The threshold calculator module 630 dynamically generates a luminance threshold based upon aggregate data from a large number of video frames. For example, the threshold calculator module 630 may use the luminance data from the frames of one or more video programs to determine a luminance threshold. In one embodiment, luminance data is aggregated for particular programs, broadcasters, or carriers to provide custom luminance thresholds for black field detection. In one embodiment, the luminance data for a recorded program may be aggregated to provide a luminance threshold for that program. The threshold calculator module 630 includes a luminance banding module 632 and a threshold identification module 634.

Figure 7:
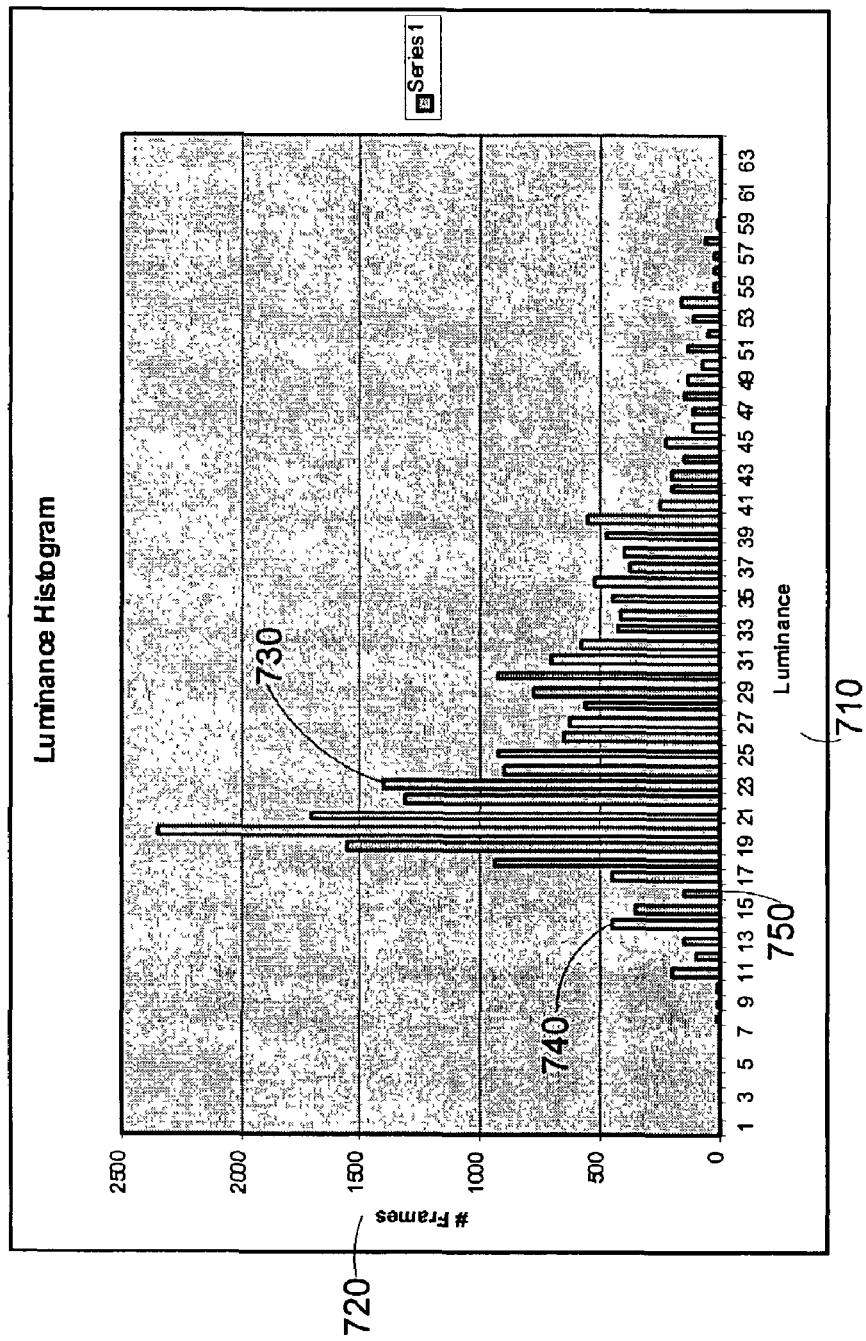
FIG. 7 is an example luminance histogram for determining a black field detection threshold according to an embodiment of the invention.

The luminance banding module 632 aggregates the luminance data for a plurality of video frames. The luminance banding module 632 defines a plurality of luminance bands. Each video frame is assigned to a luminance band based upon its total luminance. By sampling a large number of frames (e.g., 20,000+), the luminance banding module 632 may construct a luminance histogram. An example luminance histogram 700 is provided as FIG. 7. In the example luminance histogram 700, the x-axis 710 includes 64 luminance bands into which the frames are grouped. The 64 luminance bands define continuous ranges of luminance values to which each sampled frame is assigned. The y-axis 720 is the number of frames falling within the luminance bands. In one embodiment, the luminance banding module 632 aggregates the luminance data for a video presentation in order to create a luminance histogram for that video presentation. As a video presentation is recorded, the luminance banding module may receive a luminance value for each frame from the video characteristic detector 610. The luminance value for each frame may be used to increment a frame counter for the appropriate luminance band. Some alternate embodiments may include variations the sampling rate (e.g., every field, every X frames, randomly selected frames, etc.), timing of histogram construction (e.g., post recording, during playback, etc.), number of bands, or sampling period (e.g., time-based, multiple presentations, etc.).

The threshold identification module 634 uses the luminance histogram assembled by the luminance banding module 632 to determine a luminance threshold for black field detection. In the example luminance histogram 700, there is a large peak 730 representing the luminance of frames in most program content and commercials. There is a smaller peak 740 representing the luminance of frames in most black fields defining transitions among portions of program content and commercials. Between the large peak 730 and the smaller peak 740 is a notch 750 corresponding to luminance band 16. The luminance threshold can be determined from the luminance histogram to be a value corresponding to the notch 750 (luminance band 16). The location of notch 750 will vary with the quality of the black fields, signal quality, and other factors that may vary from system to system and program to program. The notch 750 may be located by calculating the slope in the luminance histogram. In one embodiment, each significantly different luminance level is stored in a record along with the number of consecutive frames that it has occurred in. When a detected luminance level meets some nominal brightness level, the immediately preceding luminance records are searched for the lowest luminance that follows a higher luminance and this value is noted as the lowest amongst that curve. The search continues through the preceding luminance values until the next preceding record holds a lower luminance value. The number of frames between the high points on the curve are added and the sum is compared to the number of frames that would total 4 seconds at the current frame rate. If the curve spans less than 4 seconds of time and the lowest point on the curve is below a maximum reasonable threshold for darkness, that curve is classified as a notch and the low value can be evaluated as a potential new threshold. To evaluate a low value as a potential new threshold, the low value is recorded in a list of recent low values and then compared against the average of that list. Then, any elements of the list that are greater than a predetermined difference from the list are averaged. If the new low value is within the same difference from the second average as the components of the second average are from the first average then the new low value becomes the new threshold. Once calculated, the luminance threshold value is communicated to the event handler module 640.

The event handler module 640 evaluates the video and audio characteristics detected by video characteristic detector module 610 and audio characteristic detector module 620 and determines whether an event should be recorded to the event index. The event handler module 640 includes a black field conditions module 642, a silence conditions module 644, a program logic module 646, and an aggressiveness settings module 648.

The black field conditions module 642 provides the logic for evaluating the luminance data of a particular frame against a threshold luminance value for identifying a black field. The black field conditions module 642 receives the threshold luminance value from the threshold calculator module 630. When a frame interrupt is generated by the video characteristic detection module 610, the black field conditions module 642 receives the luminance value and compares it against threshold luminance. Luminance values that are equal to or below the threshold luminance indicate a black field and may prompt the event handler module 640 to receive audio data from the audio characteristics detector module 620. The tolerance for the luminance values may be adjusted based upon information from the aggressiveness settings module 648.

The silence conditions module 644 provides logic for evaluating the minimum and maximum audio values of a particular audio field for identifying silence. The silence conditions module 644 receives the minimum and maximum audio values from the audio characteristics detector module 620. The silence conditions module 644 calculates the difference between the maximum and minimum values. The difference is divided by the maximum value to determine whether it falls within an acceptable silence threshold. For example, the acceptable silence threshold may establish that the difference is less than 1.1-1.6% of the maximum value. The exact threshold may be determined by the aggressiveness settings module 648. A frame that meets both the black field threshold conditions and the silence threshold conditions may be identified as an event and communicated to the event indexer module 650.

The program logic module 646 may coordinate receipt and evaluation of characteristics by the black field conditions module 642 and the silence conditions module 644. In one embodiment, the program logic module 646 identifies the video program being evaluated and tracks the location in the content file from which the video characteristics detector module 610 and audio characteristics detector module 630 are evaluating. The program logic module 646 may determine whether both conditions need to be met and the tolerances within which to classify the frame as an event. Where multiple types of events are possible, the program logic module 646 may include criteria for classifying events. The program logic module 646 may include additional parameters for selecting whether or not frames meeting the black field and silence conditions are treated as events. For example, the program logic module 646 may track the time elapsed within a video program and exclude all frames within a certain amount of time around the beginning or end of the video program (e.g., within 2 minutes). The program logic module 646 may communicate the location and event type of events detected to the event indexer module 650.

The aggressiveness settings module 648 regulates the acceptable tolerances of received values from the video characteristic detector module 610 and the audio characteristic detector module 620. Because the thresholds defined by the black field conditions module 642 and the silence conditions module 644 may only be approximations, the aggressiveness settings module 648 may determine the actual thresholds used to determine if the conditions are met. For example, if the generated thresholds are too low, some silent black screens may not be marked as events (false negatives). However, this may be acceptable where signal quality and dark, quiet programming may otherwise generate false positives that could cause program content to be skipped by a navigation function. In one embodiment, the aggressiveness settings module 648 may use an algorithm for weighing combined proximity to the luminance threshold and the silence threshold. In one embodiment, the aggressiveness settings module 648 may be user controlled depending on assessment of user content/signal quality and acceptable risk of false positives and negatives.

The event indexer module 650 generates an event index based upon the events identified by the event handler module 640. For example, the event indexer module 650 may insert an event tag within a time-based index file to provide a data pointer correlating the event to a particular location within a video data file. Alternatively, the event indexer module 650 may generate a separate event index including a table of event tags and corresponding file locations. The event indexer module 650 includes a content file location module 652 and a type identifier module 654.

The content file location module 652 receives the data corresponding to the file location, such as a GOP or time reference. The content file location module 652 ensures that the event tag is inserted in the correct location in an existing index or that a proper index entry is generated for a new location.

The type identifier module 654 receives data corresponding to the type of event, such as a black field/silence event, commercial group beginning event, commercial group ending event, or other type of event. The type identifier module 654 ensures that the event tag is properly identified when inserted in the index file. Where only a single type of event is handled by the event handler module 640, the type identifier module 654 ensures that the event tag is designated as an event tag and not confused with a time-index data pointer, a program start data pointer, a program end data pointer, or another type of data pointer. In one embodiment, the event tag is added to an existing file location entry, such as a pre-existing time-index data pointer, to distinguish the existing entry as an event data pointer. The resulting event data pointers may be used by a content navigator to provide enhanced navigation options. For example, a commercial skipping function could provide commercial skipping based upon playback analysis of black field/silence event data pointers.

Figure 8:
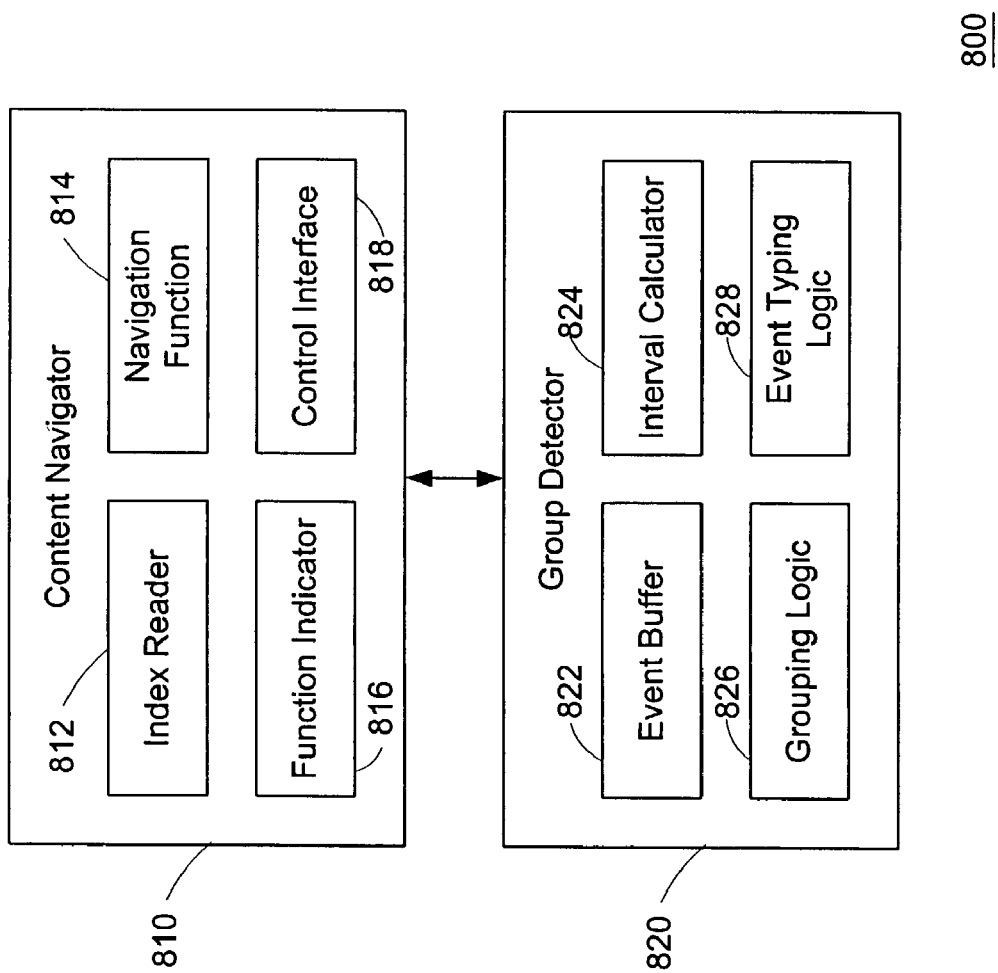
FIG. 8 is a block diagram illustrating a modular description of a system for providing content navigation according to an embodiment of the invention.

FIG. 8 shows a system 800 for navigating video presentation content based upon an event index. The system 800 may be embodied in a DVR, such as DVR 100 of FIG. 1. The system 800 operates in conjunction with digital video data and an event index. The system 800 identifies content transitions based upon event patterns in the event index and provides one or more navigation options based upon those content transitions. For example, the system 800 may identify transitions between program content and commercials or commercial groups and provide a navigation function for automatically skipping the commercials or commercial groups during playback. The system 800 includes a plurality of modules. In one embodiment, the plurality of modules is embodied in software instructions on a computer readable storage media. The plurality of module may be executed in a DVR or other system that includes appropriate hardware for receiving or generating a digital video program and an event index. In an alternate embodiment, the plurality of modules may include a combination of software and hardware components for executing their functions. The system 800 includes a content navigator module 810 and a group detector module 820.

The content navigator module 810 provides logic for using an event index to navigate a corresponding content file containing the video data for one or more video programs. For example, each presentation of a video program may include one or more commercials interspersed with the program content. The event index includes data pointers corresponding transitions among video content and commercials. The content navigator module 810 provides one or more navigation functions that may utilize the event index. For example, the content navigator module 810 may provide a commercial skipping function, a commercials only function, or other functions. The content navigator module 810 may be supported by the group detector module 820, which detects patterns in the event index to identify the type of content (e.g., program or commercial) separated by the events. The content navigator module 810 includes an index reader module 812, a navigator function module 814, a function indicator module 816, and a control interface module 818.

The index reader module 812 selectively reads event data from an event index. The event data may include event tags including a data pointer to a file location corresponding to the event. The event tags may also include an event identifier for identifying the type of event. The index reader module 812 may identify a particular type of event tag that is relevant to the navigation functions being provided by the content navigator module 810. For example, where the function being provided involves commercial navigation, the index reader module 812 may select event tags for black field/silence events that are used to separate program content and commercials. The index reader module 812 retrieves the event data from the event index in response to initiation of the function, such as playback with a commercial skip feature enabled. The event data retrieved from the index reader may benefit from additional processing before being used for the navigation function. In this case, additional processing may be provided by another module, such as the group detector module 820. The index reader module 812 may pass retrieved event data to the other module, receive processed event data back from the other module, and direct the processed event data to the navigation function module 814.

The navigation function module 814 includes the logic for providing one or more navigation functions based upon the event data. For example, the navigation function module 814 may provide the logic for a commercial skipping feature. The navigation function module 814 receives event data from the index reader 812. For example, the processed events data pointers corresponding to the beginning and end of a commercial group. During playback, the navigation function module 814 may monitor the video data stream to identify the location of a commercial group beginning. When the location is reached, the navigation function module may call upon the function indicator module 816 to provide notification of commercial skipping to the user. The navigation function module 814 may then guide the playback stream to the commercial group end and resume normal playback. In one embodiment, the navigation function module 814 concatenates the program video stream before the beginning of the commercial group with a function identifier and the program video stream after the end of the commercial group. Initiation, termination, and other control of the navigation function may be controlled using control signals defined in the control interface module 818.

The function indicator module 816 provides a function indicator to inform the user that the function is operating. The function indicator module 816 may include a status indicator, such as an LED or other display on a DVR control panel or remote control. Other status indicators may include on-screen graphic overlays, such as an icon overlay or an active function list in a "control panel" pop-up menu. The function indicator module 816 may include one or more operation indicators for informing the user that a particular operation is being performed by the navigation function, such as skipping a commercial group. For example, the function indicator module 816 may provide an indicator similar to a status indicator or a variation in a status indicator (e.g., blinking LED) during an actual operation. In one embodiment, a custom indicator algorithm may generate an indicator during an operation. For example, the function indicator module 816 may generate a custom indicator when a particular commercial group is skipped. An example indicator algorithm would be one that samples a portion of the first commercial in a commercial group (e.g., 3-5 seconds) and a portion of the last commercial in a commercial group (e.g., 5-10 seconds), concatenates the two and places an icon overlay over them. The resulting indicator is thus different for each commercial group and gives the user information about both the operation and the content being skipped. Alternate algorithms might concatenate a portion of each commercial in the commercial group, vary the length of concatenated portions, or provide additional information through the graphic overlay (e.g., duration or # of commercials skipped). The function indicator module 816 provides the indicator in cooperation with execution of the navigation function by the navigation function module 814.

The control interface module 818 provides an interface between operation of the navigation function module 814 and general operation of the DVR. The control interface module 818 correlates initiation, execution, and/or termination of the navigation function with operation of the DVR. The control interface module 818 may define compatibility between other DVR functions and the navigation function. The control interface module 818 defines triggering events, both mode and control signals, for the navigation function. In one embodiment, the control interface module 818 may define one or more variables governing activation of the navigation function when the DVR is in a particular state, such as playback mode, playback menu mode, live view mode, program guide menu mode, etc. For example, a commercial skip function may be active or inactive during playback. The control interface module 818 may define one or more control signals for toggling the commercial skip function between active and inactive modes, such as a button on (and corresponding control signal from) a remote control. A commercial skip function is inactive in menu modes, but a user may wish to select whether a subsequently viewed video program will start with the commercial skip in the active or inactive mode. The control interface module 818 may provide a global default through a menu system for defining whether the commercial skip function is active or inactive at the start of playback (e.g., when the play button is pressed). The control interface module 818 may provide menu options for selecting whether or not the commercial skip function is active when playback is selected from a playback menu. The control interface module 818 may define that the commercial skip is always inactive in live view mode or delayed view mode (a form of playback) where there is insufficient time to buffer and process events for identifying commercial groups (e.g. a time delay of less than two minutes). The control interface module 818 may define compatibility with other navigation features that may be activated in the same mode as the navigation function, such as instant replay, slow motion, fast-forward, skip forward, and reverse during playback mode. Other relationships to operation mode and control signals may be defined for other navigation functions. The control interface module 818 may include cues, graphics, and logic structure for prompting control signals through a graphical user interface.

The group detector module 820 provides an additional layer of event processing between generation of an event index and utilization of event data in a navigation function. The group detector module 820 analyzes a sequence of events and uses event pattern recognition to identify content separated by events as commercial content or program content. In alternate embodiments, the group detector module 820 may process a variety of event types and classify content portions according to a more complex identification scheme. For example, video processing or metadata may be used to extract more detailed information about content to allow classification of individual program segments, commercial types, news segments, etc. In the embodiment shown, the group detector module 820 includes an event buffer module 822, and interval calculator module 824, a grouping logic module 826, and an event typing logic 828.

The event buffer module 822 receives and aggregates events from an event index. In one embodiment, the event buffer 822 receives selected events from the content navigator module 810 that it has read from an index file. The event buffer module 822 stores a plurality of events for analysis. In one embodiment, the event buffer module 822 buffers event data for a set period of time, such as 2 minutes. For example, the event buffer module 822 may include a 2 minute ring buffer. In an alternate embodiment, the event buffer module 822 buffers event data for an entire video program. In still another embodiment, the event buffer module 822 stores a set number of events before the earliest stored event data is pushed off the event stack to make room for a new event. The other modules in the group detector module 820 analyze the data stored by the event buffer module 822.

The interval calculator module 824 calculates the intervals between adjacent events. The interval calculator looks at the locations of adjacent events in the event buffer module 822 and calculates the elapsed time between them. The calculated elapsed times are passed to the grouping logic module 826 for further processing. In an alternate embodiment, the interval calculator module 824 calculates the interval between events as each event is buffered (the event buffer module 822 need not hold more than two events). The calculated intervals are added to an interval buffer for further processing by the grouping logic module 826.

The grouping logic 826 provides the logic for identifying a commercial group based upon a series of events. In one embodiment, the grouping logic includes conditions for selecting commercial length intervals and minimum conditions for commercial groups. For example, commercial length intervals may include intervals that are: 0-35 seconds, 38-40 seconds, 43-47 seconds, and 56-60.5 seconds. Minimum conditions for commercial groups may include that there must be at least two adjacent commercial length intervals and that the total time for the group must be at least 59 seconds. Additional grouping logic may include identification of program content intervals (e.g., >120 seconds) and the location of the commercial intervals within a program presentation (e.g., 12 minutes into a program). More complex grouping logic may be employed where multiple event types are being evaluated. Once a commercial group has been identified the events within that commercial group may be passed to the event typing logic module 828 to further classify the event for use by the content navigator module 810.

The event typing logic module 828 classifies the events surrounding an identified commercial group. The content navigator module 810 may operate based upon the ability to identify specific types of events and where they appear in the video data. For example, a commercial skipping function may rely on identification of the beginning and end of a commercial group. A next commercial function may rely on identification of the beginning of adjacent commercials. Other functions may have other requirements. In one embodiment, the event typing logic module 828 identifies the event preceding the commercial group (the commercial group beginning) and the event following the commercial group (the commercial group end). In one embodiment, the event typing logic module 828 identifies the events between commercials in a commercial group. The identified events may be tagged for use by or otherwise communicated to the content navigator module 810. In one embodiment, the events may be assigned identifiers to be used by a plurality of navigation functions.

In an alternate embodiment, the group detector module 820 operates in conjunction with an event handler, such as event handler 640 in FIG. 6. Event groups may be detected and events identified prior to being added to an event index. For example, events detected by the event handler are buffered to the group detector module 820 and the group detector module 820 identifies selected events and provides appropriate tags to an event indexer module for storage in the event index. In this alternate embodiment, the group detector module 820 may act otherwise as described above.

Figure 9:
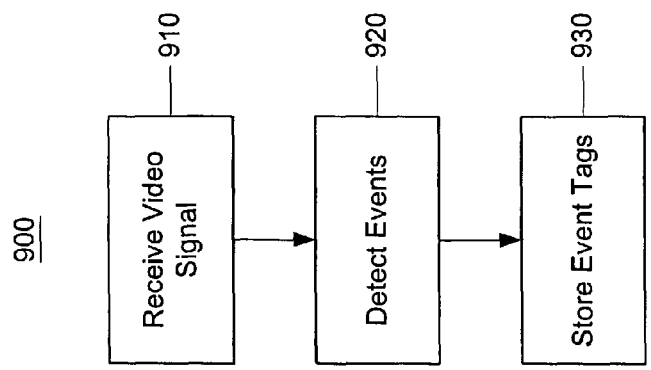
FIG. 9 is a flow chart illustrating a first example method of generating an event index according to an embodiment of the invention.

FIG. 9 shows a method 900 of generating an event index. The method 900 may be performed using an embodiment of the systems described above with regard to FIGS. 1-8. For additional details of the steps of method 900, see the system descriptions above. In step 910, a video signal is received. For example, the video signal may be received by a DVR from a broadcast source. In step 920, events are detected from the video signal. For example, black field and silent frame events may be detected from the video signal. In step 930, event tags corresponding to the detected events are stored in an event index. For example, location information for the detected black field and silent frame events may be stored in an event index so that they may be used later in a navigation function.

Figure 10:
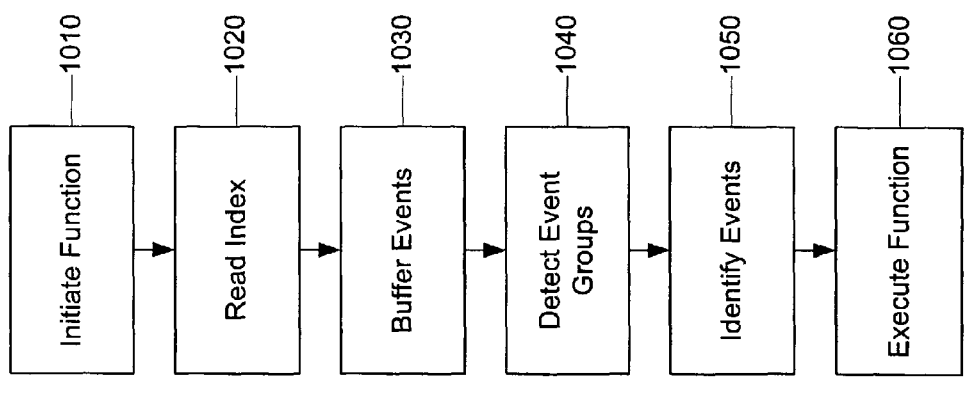
FIG. 10 is a flow chart illustrating a first example method of providing content navigation according to an embodiment of the invention.

FIG. 10 shows a method 1000 of providing content navigation using an event index. The method 1000 may be performed using an embodiment of the systems described above with regard to FIGS. 1-8. For additional details of the steps of method 1000, see the system descriptions above. The method 1000 may be performed in conjunction with an event index generated using the method 900. In step 1010, a navigation function is initiated. For example, playback with a commercial skipping feature activated is initiated on a DVR. In step 1020, an event index is read. For example, the DVR may scan ahead in an index file corresponding to the program being played to locate event tags. In step 1030, events from the event index are buffered to an event buffer. For example, the DVR may buffer events corresponding to two minutes of video program time forward from the current playback position. In step 1040, event groups are detected from series of buffered events. For example, events corresponding to a commercial group may be identified based upon the interval pattern between buffered events. In step 1050, one or more events are identified based upon position in the event group. For example, the events corresponding to the beginning of the commercial group and the end of the commercial group may be identified. In step 1060, a navigation function based upon the identified events is executed. For example, the DVR may skip from location of the event corresponding to the beginning of the commercial group to the location of the event corresponding to the end of the commercial group, thus skipping the commercial group.

FIG. 11 shows a method 1100 of generating an event index. The method 1100 may be performed using an embodiment of the systems described above with regard to FIGS. 1-8. For additional details of the steps of method 1100, see the system descriptions above. In step 1110, a video signal is received. For example, the video signal may be received by a DVR from a broadcast source. In step 1120, events are detected from the video signal. For example, black field and silent frame events may be detected from the video signal. In step 1130, detected events are buffered to an event buffer. For example, the DVR may buffer detected black field and silent frame events corresponding to two minutes of video program time. In step 1140, event groups are detected from series of buffered events. For example, events corresponding to a commercial group may be identified based upon the interval pattern between buffered events. In step 1150, one or more events are identified based upon position in the event group. For example, the events corresponding to the beginning of the commercial group and the end of the commercial group may be identified. In step 1160, event tags corresponding to the detected events are stored in an event index. For example, location information for the identified beginning of commercial group and end of commercial group events may be stored in an event index for later use in a navigation function.

FIG. 12 shows a method 1200 of providing content navigation using an event index. The method 1200 may be performed using an embodiment of the systems described above with regard to FIGS. 1-8. For additional details of the steps of method 1200, see the system descriptions above. The method 1200 may be performed in conjunction with an event index generated using the method 1100. In step 1210, a navigation function is initiated. For example, playback with a commercial skipping feature activated is initiated on a DVR. In step 1220, an event index is read. For example, the DVR may scan ahead in an index file corresponding to the program being played to locate event tags corresponding to the beginning and end of a commercial group. In step 1230, a navigation function based upon the identified events is executed. For example, the DVR may skip from location of the event corresponding to the beginning of the commercial group to the location of the event corresponding to the end of the commercial group, thus skipping the commercial group.

FIG. 13 shows a method 1300 of determining a black field detection threshold. The method 1300 may be performed using an embodiment of the systems described above with regard to FIGS. 1-8. For additional details of the steps of method 1300, see the system descriptions above for FIG. 6. In step 1310, a plurality of luminance bands is defined. For example, video frame luminance from completely bright to completely dark may be broken up into 64 evenly spaced bands. In step 1320, a detection window is defined. For example, the detection window may be defined to include an entire video frame except the area typically used for broadcaster logos or watermarks. In step 1330, the luminance components of all of the pixels within the detection window of a selected video frame are summed. For example, the luminance component of each pixel is sequentially added to calculate a total luminance value. In step 1340, the frame is added to a luminance histogram. For example, the total luminance calculated in step 1330 falls within the $23^{rd}$ luminance band, so the number of frames in that band is incremented by one. In step 1350, another frame is selected for processing and the method returns to step 1330. For example, the next frame in a video program may be selected for analysis. In step 1360, a threshold band between black fields and normal video content is identified. For example, a luminance band between a first peak corresponding to program content and a second peak corresponding to black fields is identified. In step 1370, a threshold value is calculated based upon the identified threshold band. For example, the threshold value may be set at the high, low, or median value of the identified band.

FIG. 14 shows a method 1400 of detecting a video event in a video data stream. The method 1400 may be performed using an embodiment of the systems described above with regard to FIGS. 1-8. For additional details of the steps of method 1400, see the system descriptions above for FIG. 6. In step 1410, a detection window is defined. For example, a DVR may define a detection window to include an entire video frame except the area typically used for broadcaster logos or watermarks. In step 1420, the luminance components of all of the pixels within the detection window of a selected video frame are summed. For example, the DVR may sequentially add the luminance component of each pixel to calculate a total luminance value. In step 1430, a frame interrupt is generated. For example, the DVR may reach the end of the video data for the present frame and prepare to use the total luminance value for further calculations. In step 1440, the total luminance is compared to a luminance threshold. For example, the DVR may compare the total luminance of the frame to a luminance threshold calculated using the method 1300 of FIG. 13. If the total luminance is less than the luminance threshold, a black field event has been detected. In step 1450, silence detection may optionally be initiated for the frame. For example, the DVR may initiate a method of audio event detection on audio data corresponding to the processed video frame.

FIG. 15 shows a method 1500 of detecting an audio event in a video data stream. The method 1500 may be performed using an embodiment of the systems described above with regard to FIGS. 1-8. For additional details of the steps of method 900, see the system descriptions above for FIG. 6. In step 1510, an audio channel is selected. For example, a DVR may select the left audio channel from a multi-channel audio track associated with a particular video frame. In step 1520, minimum and maximum values are determined for the audio. For example, the DVR may scan the frequencies in the audio channel for a maximum and a minimum value. In step 1530, the percent difference between the maximum and minimum values is determined. For example, the DVR may calculate the difference between the maximum and minimum values and divide by the minimum value to calculate the percent difference. In step 1540, the threshold audio conditions are determined. For example, the DVR may use a predetermined threshold percent difference of 1.6%. In step 1550, the calculated percent difference is compared to the threshold condition to determine whether the condition is met. For example, the DVR may determine whether the calculated percent difference is less than the threshold of 1.6%. If so, an audio event has been detected.

The invention claimed is:
1. A method of commercial detection, comprising:
receiving a video signal that includes a video program and a commercial;
detecting a set of events in the video signal as the video signal is received that identifies the presence of the commercial;
storing video data corresponding to the video signal in a first digital file;
storing a data pointer in a second digital file as the first digital file is being stored, the data pointer indicating a location in the first digital file substantially corresponding to an event from the set of events;
providing signals used to produce a display of the video program from the first digital file; and
using the data pointer in the second digital file to prevent at least a substantial portion of the commercial from being displayed during the display of the video program.

2. The method of claim 1, wherein the set of events includes a first event and a second event, the method further comprising:
detecting a relationship between the first event and the second event; and
comparing the relationship to a set of predefined commercial detection conditions to identify the presence of the commercial.

3. The method of claim 2, wherein the relationship between the first event and the second event includes an elapsed time between the first event and the second event.

4. The method of claim 1, wherein the advertisement is a first advertisement in a commercial group and the data pointer is a first data pointer, the location in the first digital file corresponding to a beginning location of the commercial group.

5. The method of claim 4, wherein the commercial group includes a last commercial; and further comprising:
inserting a second data pointer in the second digital file, the data pointer indicating an ending location in the first digital file of the last commercial.

6. The method of claim 1, wherein the video data is stored in a compressed digital video format.

7. The method of claim 1, further comprising:
storing a time index of the video data in the second digital file.

8. The method of claim 1, wherein detecting the set of events in the video signal comprises detecting predefined characteristics in the luminance component of the video signal.

9. The method of claim 1, wherein detecting the set of events in the video signal comprises detecting predefined characteristics in the audio component of the video signal.

10. The method of claim 1, wherein detecting the set of events in the video signal comprises using aggressiveness settings to determining whether the video signal contains an event indicative of the commercial.

11. The method of claim 1, wherein the first digital file and the second digital file are stored in a common memory.

12. The method of claim 1, wherein the first digital file and the second digital file are stored in a common memory.

13. A computer readable data storage device that stores a set of software instructions, which when executed effectuate detection of commercials in a video signal, comprising instructions for:
- receiving a video signal that includes a video program and a commercial;
- detecting a set of events in the video signal as the video signal is received that identifies the presence of the commercial;
- storing video data corresponding to the video signal in a first digital file;
- storing a data pointer in a second digital file as the first digital file is being stored, the data pointer indicating a location in the first digital file substantially corresponding to an event from the set of events;
- providing signals used to produce a display of the video program from the first digital file; and
- using the data pointer in the second digital file to prevent at least a substantial portion of the commercial from being displayed during the display of the video program.

14. The data storage device of claim 13, wherein the set of events includes a first event and a second event, the storage medium further comprising instructions for:
- detecting a relationship between the first event and the second event; and
- comparing the relationship to a set of predefined commercial detection conditions to identify the presence of the commercial.

15. The data storage device of claim 14, wherein the relationship between the first event and the second event includes an elapsed time between the first event and the second event.

16. The data storage device of claim 13, wherein the advertisement is a first advertisement in a commercial group and the data pointer is a first data pointer, the location ill the first digital file corresponding to a beginning location of the commercial group.

17. The data storage device of claim 16, wherein the commercial group includes a last commercial; and further comprising:
- inserting a second data pointer in the second digital file, the data pointer indicating an ending location of the last commercial.

18. The data storage device of claim 13, wherein the video data is stored in a compressed digital video format.

19. The data storage device of claim 13, further comprising instructions for:
- storing a time index of the video data in the second digital file.

20. The data storage device of claim 13, wherein the instructions for detecting the set of events in the video signal comprise instructions for detecting predefined characteristics in the luminance component of the video signal.

21. The data storage device of claim 13, wherein the instructions for detecting the set of events in the video signal comprises instructions for detecting predefined characteristics in the audio component of the video signal.

22. The data storage device of claim 13, wherein the instructions for detecting the set of events in the video signal comprise instructions for using aggressiveness settings to determine whether the video signal contains a set of events indicative of the commercial.

23. The computer readable data storage device of claim 13, wherein the first digital file and the second digital file are stored in a common memory.

24. A method of navigating video content, comprising:
- detecting a set of video events as the video content is received in a first digital file of video data from characteristics of the video data, wherein the video data includes a plurality of video portions and wherein the set of video events is indicative of transitions among the plurality of video portions;
- storing data pointers in a second digital file as the first digital file is being saved, the data pointers corresponding to the location of a selected video event from the set of video events; and
- navigating, during playback among the plurality of video portions in the first digital file using the data pointers in the second digital file.

25. The method of claim 24, wherein the characteristics of the video data used for detecting the set of video events comprises a luminance component of the video data.

26. The method of claim 24, wherein the characteristics of the video data used for detecting the set of video events comprises an audio component of the video data.

27. The method of claim 24, further comprising identifying video event groups based upon predefined relationships among the set of video events and wherein the data pointers further correspond to the location of identified video event groups in the first digital file.

28. The method of claim 24, wherein the first digital file and the second digital file are stored in a common memory.

29. A video recorder, comprising:
- a video input for receiving video signals including a video program and a set of commercials;
- a first digital file for storing video data as the video signals are received, the video data corresponding to received video signals;
- a second digital file for storing data pointers as the first digital file is being stored, the data pointers pointing to a plurality of locations within the video data in the first digital file;
- a commercial detection module for identifying the set of commercials within the video data and inserting tags into the second digital file, the tags corresponding to a location of the set of commercials with the first digital file; and
- a content navigation module for controlling video output from the first digital file based upon the tags inserted in the second digital file, whereby substantial portions of the set of commercials may be excluded from the video output.

30. The video recorder of claim 29, wherein the video data is stored in the first digital file in a compressed digital video format.

31. The video recorder of claim 29, wherein the second digital file includes a time index of the video data for use by the content navigation module.

32. The video recorder of claim 29, wherein the commercial detection module comprises:
- an event identifier module for identifying a set of video events in the video data that identifies the presence of the set of commercials;
- a group identifier module for identifying patterns in the set of video events that identify the presence of the set of commercials; and
- an index tagging module for inserting tags into the second digital file based upon the patterns identified by the group identifier module.

33. The video recorder of claim 29, further comprising a video event detector for detecting video events within the received video signal.

34. The video recorder of claim 29, further comprising an audio event detector for detecting audio events within the received video signal.

35. The video recorder of claim 29, wherein the commercial detection module includes aggressiveness settings for determining thresholds for identifying the set of commercials in the video data.

36. The video recorder of claim 29, wherein the first digital file and the second digital file are stored in a common memory.

37. A video recorder, comprising:
- an input means for receiving video signals including a video program and a set of commercials;
- first storage means for storing video data as the video signals are received, the video data corresponding to received video signals;
- second storage means for storing data pointers as the video data is stored, the data pointers pointing to a plurality of locations within the video data in the first storage means;
- commercial detection means for identifying the set of commercials within the video data and inserting tags into the second storage means for locating the set of commercials; and
- content navigation means for controlling video output from the first storage means based upon the tags inserted in the second storage means, whereby substantial portions of the set of commercials may be excluded from the video output.

38. The video recorder of claim 37, wherein the video data is stored in the first storage means in a compressed digital video format.

39. The video recorder of claim 37, wherein the second storage means includes a time index of the video data for use by the content navigation means.

40. The video recorder of claim 37, wherein the commercial detection means comprises:
- event identifier means for identifying a set of video events in the video data that identifies the presence of the set of commercials;
- group identifier means for identifying patterns in the set of video events that identify the presence of the set of commercials; and
- index tagging means for inserting tags into the second storage means based upon the patterns identified by the group identifier means.

41. The video recorder of claim 37, further comprising a video event detector means for detecting video events within the received video signal.

42. The video recorder of claim 37, further comprising an audio event detector means for detecting audio events within the received video signal.

43. The video recorder of claim 37, wherein the commercial detection means includes aggressiveness settings for determining thresholds for identifying the set of commercials.

* * * * *